United States Patent
Du et al.

(10) Patent No.: US 10,008,164 B2
(45) Date of Patent: Jun. 26, 2018

(54) VARIABLE VIEWING ANGLE OPTICAL SYSTEMS

(71) Applicant: 3M INNOVATIVE PROPERTIES COMPANY, St. Paul, MN (US)

(72) Inventors: Guanglei Du, Woodbury, MN (US); John A. Wheatley, Lake Elmo, MN (US); Christopher R. Yungers, St. Paul, MN (US); James M. Hillis, Redmond, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 13 days.

(21) Appl. No.: 15/315,076

(22) PCT Filed: May 27, 2015

(86) PCT No.: PCT/US2015/032542
§ 371 (c)(1),
(2) Date: Nov. 30, 2016

(87) PCT Pub. No.: WO2015/183869
PCT Pub. Date: Dec. 3, 2015

(65) Prior Publication Data
US 2017/0116937 A1    Apr. 27, 2017

Related U.S. Application Data

(60) Provisional application No. 62/005,542, filed on May 30, 2014.

(51) Int. Cl.
*G09G 3/36* (2006.01)
*G02F 1/1347* (2006.01)
(Continued)

(52) U.S. Cl.
CPC ......... *G09G 3/3644* (2013.01); *G02F 1/1323* (2013.01); *G02F 1/13476* (2013.01);
(Continued)

(58) Field of Classification Search
CPC ........... G09G 3/3644; G09G 2320/068; G09G 2310/06; G02F 1/1323; G02F 1/13476; G02B 6/0011
See application file for complete search history.

(56) References Cited

U.S. PATENT DOCUMENTS

| 4,542,449 A | 9/1985 | Whitehead |
| 4,824,216 A | 4/1989 | Perbet |

(Continued)

FOREIGN PATENT DOCUMENTS

| CA | 2798543 | 6/2013 |
| EP | 1228424 | 8/2002 |

(Continued)

OTHER PUBLICATIONS

Walker, "Structured Surfaces for Active Daylighting," Nov. 2013, pp. 1-18.
(Continued)

*Primary Examiner* — Abhishek Sarma
(74) *Attorney, Agent, or Firm* — Clifton F. Richardson

(57) ABSTRACT

Optical systems are described that include a switchable diffuser, a display panel, a lighting component and a diffuser controller. The diffuser controller is configured to switch the state of the switchable diffuser when the diffuser controller determines that the diffuser state is to be changed. The diffuser controller may be configured to vary an output level of the display panel in association with a change in state of the switchable diffuser. The optical system may also include a switching device which may be separable from the display panel.

24 Claims, 10 Drawing Sheets

(51) Int. Cl.
  *G02F 1/13* (2006.01)
  *F21V 8/00* (2006.01)
(52) U.S. Cl.
  CPC ........ *G02B 6/0011* (2013.01); *G09G 2310/06* (2013.01); *G09G 2320/068* (2013.01)

(56) References Cited

U.S. PATENT DOCUMENTS

| | | | |
|---|---|---|---|
| 4,893,117 | A | 1/1990 | Blomley |
| 5,109,219 | A | 4/1992 | Kastan |
| 5,175,030 | A | 12/1992 | Lu |
| 5,183,597 | A | 2/1993 | Lu |
| 5,831,698 | A | 11/1998 | Depp |
| 5,877,829 | A | 3/1999 | Okamoto |
| 6,039,533 | A | 3/2000 | McCabe |
| 6,211,930 | B1 | 4/2001 | Sautter |
| 7,203,904 | B2 | 4/2007 | Lee |
| 7,349,043 | B2 | 3/2008 | Sumiyoshi |
| 7,532,800 | B2 | 5/2009 | Iimura |
| 7,630,026 | B2 | 12/2009 | Sumiyoshi |
| 7,699,516 | B1 | 4/2010 | Lee |
| 8,405,572 | B1 | 3/2013 | Want |
| 8,502,816 | B2 | 8/2013 | Butler |
| 8,599,344 | B2 | 12/2013 | Yeh |
| 8,681,075 | B2 | 3/2014 | Uehara |
| 8,830,221 | B2 | 9/2014 | Yeh |
| 8,873,013 | B2 | 10/2014 | Yeh |
| 8,898,577 | B2 | 11/2014 | Schmieder |
| 8,952,978 | B2 | 2/2015 | Ogita |
| 9,104,074 | B2 | 8/2015 | Yeh |
| 2002/0190919 | A1 | 12/2002 | Lee |
| 2005/0259193 | A1 | 11/2005 | Sumiyoshi |
| 2006/0256244 | A1 | 11/2006 | Jak |
| 2006/0262057 | A1 | 11/2006 | Sumiyoshi |
| 2007/0018943 | A1 | 1/2007 | Bayrle |
| 2007/0030240 | A1 | 2/2007 | Sumiyoshi |
| 2007/0091638 | A1 | 4/2007 | Ijzerman |
| 2009/0015540 | A1 | 1/2009 | Suzuki |
| 2009/0207613 | A1 | 8/2009 | Furukawa |
| 2009/0225244 | A1 | 9/2009 | Wang |
| 2009/0244690 | A1 | 10/2009 | Lee |
| 2010/0014027 | A1 | 1/2010 | Li |
| 2011/0225542 | A1 | 9/2011 | Schmieder |
| 2011/0234605 | A1 | 9/2011 | Smith |
| 2011/0241983 | A1 | 10/2011 | Chang |
| 2011/0261038 | A1 | 10/2011 | Jiang |
| 2011/0273490 | A1 | 11/2011 | Shimazaki |
| 2011/0279472 | A1 | 11/2011 | Lu |
| 2012/0075355 | A1 | 3/2012 | Ogita |
| 2012/0130845 | A1 | 5/2012 | Telek |
| 2012/0133673 | A1 | 5/2012 | Ninan |
| 2012/0139897 | A1 | 6/2012 | Butler |
| 2012/0154458 | A1 | 6/2012 | Kay |
| 2012/0249407 | A1 | 10/2012 | Hatakeyama |
| 2012/0256976 | A1 | 10/2012 | Inada |
| 2012/0280895 | A1 | 11/2012 | Yeh |
| 2012/0293750 | A1 | 11/2012 | Yeh |
| 2012/0299982 | A1 | 11/2012 | Inada |
| 2013/0010219 | A1 | 1/2013 | Yeh |
| 2013/0021390 | A1 | 1/2013 | Inada |
| 2013/0033466 | A1 | 2/2013 | Uehara |
| 2013/0057492 | A1 | 3/2013 | Kubota |
| 2013/0100112 | A1 | 4/2013 | Yeh |
| 2013/0113685 | A1 | 5/2013 | Sugiyama |
| 2013/0124982 | A1 | 5/2013 | Zornow |
| 2013/0222743 | A1 | 8/2013 | Want |
| 2013/0321686 | A1 | 12/2013 | Tan |
| 2014/0043568 | A1 | 2/2014 | Yeh |
| 2014/0053262 | A1 | 2/2014 | Sarangdhar |

FOREIGN PATENT DOCUMENTS

| | | |
|---|---|---|
| EP | 1229422 | 8/2002 |
| EP | 1975689 | 10/2008 |
| EP | 2383727 | 11/2011 |
| EP | 2387028 | 11/2011 |
| EP | 2434476 | 3/2012 |
| EP | 2595141 | 5/2013 |
| EP | 2602656 | 6/2013 |
| GB | 2476027 | 6/2011 |
| GB | 2496113 | 5/2013 |
| JP | 2006-332816 | 12/2006 |
| JP | 4294007 | 4/2009 |
| JP | 2011-197537 | 10/2011 |
| WO | WO 2001-063396 | 8/2001 |
| WO | WO 2004-079437 | 9/2004 |
| WO | WO 2007-083540 | 7/2007 |
| WO | WO 2010-084678 | 7/2010 |
| WO | WO 2011-034157 | 3/2011 |
| WO | WO 2011-092919 | 8/2011 |
| WO | WO 2011-102321 | 8/2011 |
| WO | WO 2011-118423 | 9/2011 |
| WO | WO 2011-125899 | 10/2011 |
| WO | WO 2012-153499 | 11/2012 |
| WO | WO 2013-048519 | 4/2013 |
| WO | WO 2013-061598 | 5/2013 |
| WO | WO 2015-183867 | 12/2015 |

OTHER PUBLICATIONS

International Search Report for PCT International Application No. PCT/US2015/032542, dated Aug. 27, 2015, 3 pages.

VARIABLE VIEWING ANGLE OPTICAL SYSTEMS

BACKGROUND

Polymer dispersed liquid crystal (PDLC) layers can be used as a switchable diffuser in conjunction with louver films to provide a variable viewing angle display. There are, however, several deficiencies with such approaches. For example, PDLC layers have a haze in the clear state that is sufficiently high to be objectionable in many display applications. In addition, the circuitry required to change the state of the switchable diffuser takes up space and has substantial power requirements making PDLC-based switchable diffusers impractical for many display applications. Accordingly, a need exists for improved variable viewing angle displays.

SUMMARY

In some aspects of the present description, an optical system is provided that includes a display panel, an electrically switchable diffuser, a lighting component and a diffuser controller. The switchable diffuser, which has a diffuser state, is disposed proximate the display panel and includes one or more regions. Each of the one or more regions is capable of being in a first state or in a second state different from the first state. The lighting component is either disposed between the display panel and the switchable diffuser or disposed adjacent to the switchable diffuser opposite the display panel. The diffuser controller is configured to control the diffuser state and to control an output level of the display panel. The diffuser controller is configured to determine whether a first diffuser state of the switchable diffuser is to be changed and if the diffuser controller determines that the first diffuser state is to be changed, the diffuser controller is configured to switch the switchable diffuser from the first diffuser state to a second diffuser state over a first time period. The diffuser controller is configured to determine whether to vary an output level of the display panel in association with a change from the first diffuser state to the second diffuser state and if the diffuser controller determines that the output level is to be varied, the diffuser controller is configured to vary the output level over a second time period which overlaps with the first time period. The diffuser controller is configured to vary the output level in association with at least one diffuser state change.

In some aspects of the present description, an optical system is provided that includes a display panel, a bistable, electrically switchable diffuser disposed proximate the display panel, a lighting component, a display housing, a diffuser controller configured to control the diffuser state, and a switching device external to the display housing. The switchable diffuser has one or more regions and the switchable diffuser has a diffuser state. Each of the one or more regions is capable of being in a first state or in a second state different from the first state. The lighting component is either disposed between the display panel and the switchable diffuser or disposed adjacent the switchable diffuser opposite the display panel. The display housing contains the display panel, the lighting component and the switchable diffuser. The switching device is capable of applying a switching waveform to the switchable diffuser when the display housing is in at least one position proximate the switching device. The diffuser controller is configured to determine whether a first diffuser state of the switchable diffuser should be changed and if the diffuser controller determines that the first diffuser state should be changed and if the display housing is in the at least one position proximate the switching device, the diffuser controller is configured to provide a control signal to the switching device to switch the switchable diffuser from the first diffuser state to a second diffuser state over a first time period.

DETAILED DESCRIPTION

Figure 1:
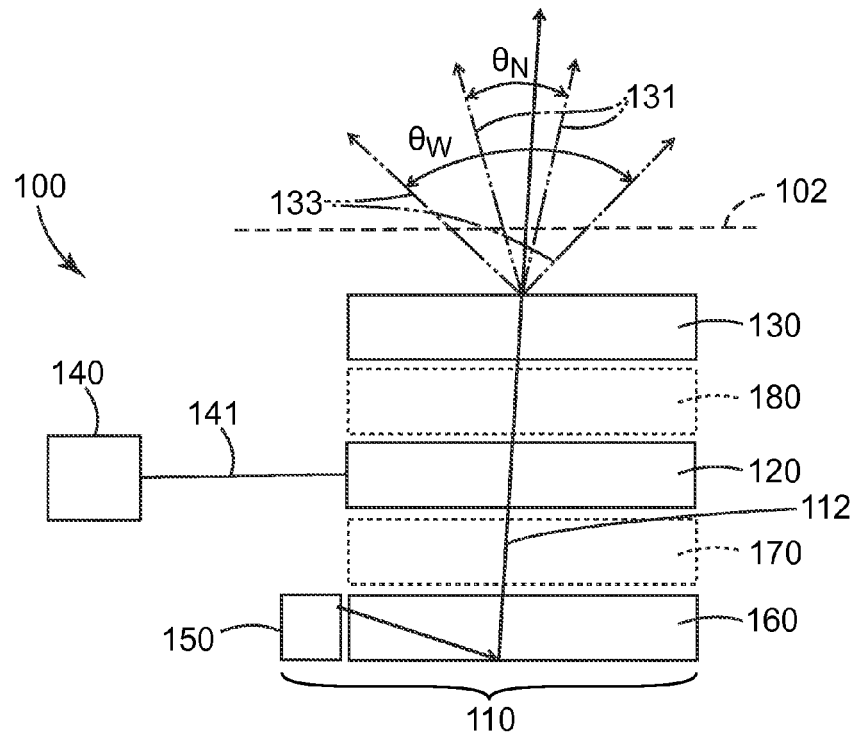
FIG. 1 is a side view of an optical system.

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Use of a polymer dispersed liquid crystal (PDLC) layer in a display in connection with a louver film in order to obtain a switchable privacy film has been described in the art. However, such an approach has not been widely adopted for at least two reasons. First, in the clear state PDLC layers have a haze of greater than 5% percent at normal incidence and an even higher haze off axis. This is sufficiently high to be objectionable in many display applications. Second, the circuitry required to switch the PDLC layers takes up space and has substantial power requirements. This is a significant issue for mobile display applications where there are significant space and power constraints.

Smectic A liquid crystals may provide a low haze alternative to PDLC switchable diffusers, but the switching speed for smectic A liquid crystal is slower than that of PDLC and this may be objectionable in some display applications. For example, while it may take 50-100 ms to switch a smectic A liquid crystal from a hazy to a clear state, it can take 500 to 1000 ms to switch from a clear to a hazy state. The applicants have discovered that if the output of a display panel is varied over a time period in which the switching of a switchable diffuser occurs, a slow switching speed of the diffuser is not objectionable to the user and may even give a desirable optical effect.

Another issue that may arise with the implementation of a switchable diffuser in a display is the space required for the circuitry needed to implement the switching. In many display applications, it is desirable for the display housing to be as small as possible for a given display size. This may be the case for both smaller displays such as cell phones where the overall size is relatively small and for large screen displays where a thin bezel and a thin screen are often desired. With a conventional PDLC layer, a voltage must be applied to keep the PDLC layer in a hazy state. The circuitry required to apply this voltage needs to be integrated into the display if it is to be used in the hazy state. The applicants have found that useful displays can be implemented where the circuitry required to switch a switchable diffuser is separate from the display housing and the switchable diffuser is bistable.

Embodiments of the present disclosure include optical systems having a switchable diffuser that intersects an optical path from a lighting component through a display panel to an output surface. In some embodiments, the lighting component is either disposed between the display panel and the switchable diffuser or disposed adjacent the switchable diffuser opposite the display panel. In some embodiments, the lighting component includes one or more light emitting diodes (LEDs). In some embodiments, the lighting component includes a light guide with a light source, such as LEDs, disposed to inject light into an edge of the light guide. Suitable light guides are described in U.S. Pat. App. Pub. No. 2010/0014027 (Li et al.) and U.S. Pat. No. 7,532,800 (Iimura) and U.S. Pat. No. 7,699,516 (Lee).

FIG. 1 is a schematic side view of optical system 100 having an output surface 102 and including lighting component 110 that is capable of producing light having optical path 112. Optical system 100 includes electrically switchable diffuser 120, display panel 130 which may have a narrow viewing angle output 131 or a wide viewing angle output 133, and diffuser controller 140 which provides diffuser state data to switchable diffuser 120 on diffuser data channel 141. Lighting component 110 includes light source 150 and light guide 160. Lighting component 110 is disposed adjacent switchable diffuser 120 opposite display panel 130. Optical system 100 can also include optional first optical film 170 and/or optional second optical film 180. Either or both of optional first optical film 170 and optional second optical film 180 can be a single film or can be a stack of films which may be laminated together with an optically clear adhesive or may be stacked together with an air gap between layers. In some embodiments, optional first optical film 170 is included and is one or more of a prism film and a louver film. Display panel 130 may include a liquid crystal display panel and may include other components such as a reflective polarizer for polarization recycling. Alternatively, a reflective polarizer may be included as a component of optional second optical film 180. Optical system 100 may further include a reflector disposed adjacent light guide 160 opposite switchable diffuser 120 which may be used to increase efficiency by providing recycling of light reflected back through the light guide by optional first optical film 170, optional second optical film 180 or a reflective polarizer that may be included with display panel 130. In some embodiments, light guide 160 includes a light reflecting rear surface.

In some embodiments, when switchable diffuser 120 is in a first state, optical system 100 produces a wide viewing angle output 133 having a characteristic viewing angle $\theta_W$ and when switchable diffuser 120 is in a second state, optical system 100 produces a narrow viewing angle output 131 having a characteristic viewing angle $\theta_N$. The characteristic viewing angle may be defined in terms of the output angular distribution of the intensity as the full width at half maximum. In some embodiments, there is a first characteristic viewing angle along a first direction and a second characteristic viewing angle along a second direction different from the first direction. For example, optical system 100 may have an output with a narrow viewing angle in a vertical direction when switchable diffuser 120 is both the first and second states and may have a wide viewing angle output in a horizontal direction when switchable diffuser 120 is in a first state and a narrow viewing angle output in a horizontal direction when switchable diffuser 120 is in a second state. In other embodiments, optical system 100 may have a wide viewing angle output in both a vertical and a horizontal direction when switchable diffuser 120 is in a first state and a narrow viewing angle output in both a vertical and a horizontal direction when switchable diffuser 120 is in a second state.

Diffuser data channel 141 is configured to provide diffuser state data and switching signals to switchable diffuser 120. In some embodiments, the diffuser controller 140 is implemented using a Central Processing Unit (CPU) in a computer. In some embodiments, the diffuser controller 140 is implemented using a microcontroller unit disposed in a monitor. The system is configured such that the diffuser controller 140 is capable of sending a signal or signals to the switchable diffuser 120 on diffuser data channel 141 to cause the switchable diffuser to change states.

In some embodiments, optional first optical film 170 includes a louver film which partially collimates light output from light guide 160 to display panel 130. When the switchable diffuser 120 is in a substantially clear state, the partially collimated light that passes through optical film 170 is still partially collimated when it reaches display panel 130. The output from the display panel is then partially collimated so that it provides a light output in a narrow viewing angle mode. When the switchable diffuser is in a hazy state, the partially collimated light is partially diffused by the switchable diffuser resulting in a less collimated light reaching the display panel 130.

Louver films absorb light, especially at off-normal incidence, and can therefore be inefficient when used in a recycling backlight. In some embodiments, optional first optical film 170 and optional second optical film 180, if included, are low absorbing. Such embodiments are discussed further elsewhere. As used herein, "low-absorbing" films or components are films or components that absorb less than about 20 percent of the luminous flux of an input light from standard illuminant E having a Lambertian angular distribution. Standard illuminant E is an equal-energy illuminant having a spectral power distribution that is constant over the visible wavelength range (380 nm-780 nm). Louver films, in comparison, can absorb about 30% of the luminous flux of an input light from standard illuminant E having a Lambertian angular distribution. In some embodiments, low-absorbing components or films are used that absorb less than about 15% or less than about 10% or even less than about 5% the luminous flux of an input light from standard illuminant E having a Lambertian angular distribution.

In the embodiment shown in FIG. 1, switchable diffuser 120 is positioned between light guide 160 and display panel 130. In other embodiments, the light guide may be positioned between the display panel and the switchable diffuser with a reflector positioned adjacent the switchable diffuser opposite the light guide. This type of arrangement is illustrated in FIG. 2.

Figure 2:
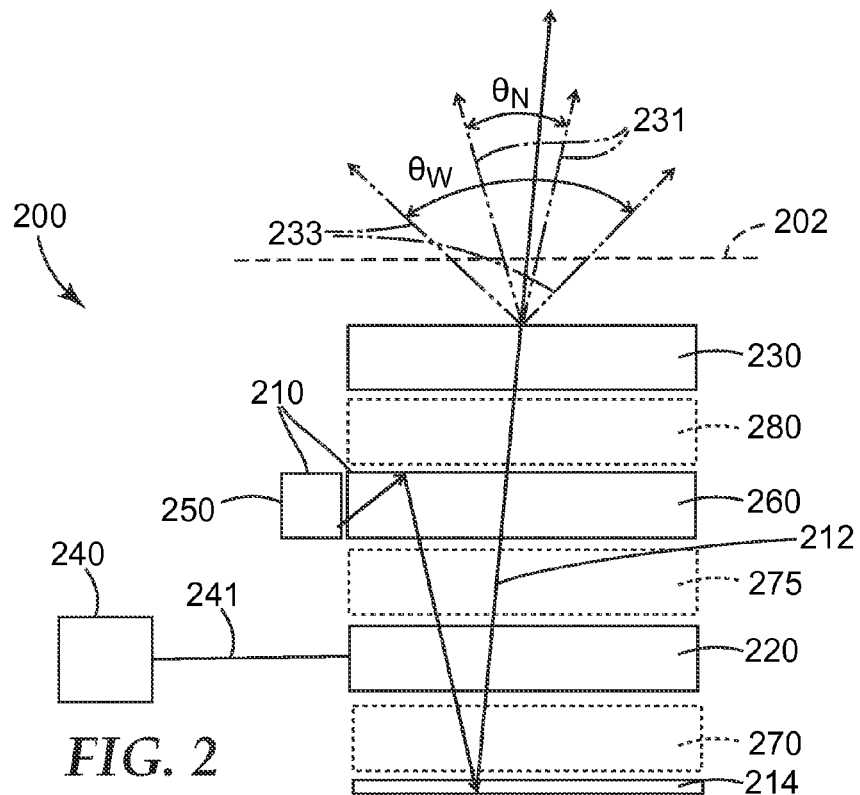
FIG. 2 is a side view of an optical system.

FIG. 2 is a schematic side view of optical system 200 having an output surface 202 and including lighting component 210 that is capable of producing light having optical path 212 which reflects from reflector 214. Optical system 200 includes electrically switchable diffuser 220, display panel 230 which may have a narrow viewing angle output 231 or a wide viewing angle output 233, and diffuser controller 240 which provides diffuser state data to switchable diffuser 220 on diffuser data channel 241. Lighting component 210 includes light source 250 and light guide 260. Lighting component 210 is disposed between display panel 230 and switchable diffuser 220. Optical system 200 can also include optional first optical film 270, and/or optional second optical film 275, and/or optional third optical film 280. One or more of optional optical films 270, 275 and 280 can be a single film or can be a stack of other films which may be laminated together with an optically clear adhesive or may be stacked together with an air gap between layers. Display panel 230 may include a liquid crystal display panel and may include other components such as a reflective polarizer for polarization recycling.

In some embodiments, when switchable diffuser 220 is in a first state, optical system 200 produces a wide viewing angle output 233 having a characteristic viewing angle $\theta_W$ and when switchable diffuser 220 is in a second state, optical system 200 produces a narrow viewing angle output 231 having a characteristic viewing angle $\theta_N$. The characteristic viewing angle may be defined in terms of the output angular distribution of the intensity as the full width at half maximum. In some embodiments, there is a first characteristic viewing angle along a first direction and a second characteristic viewing angle along a second direction different from the first direction. For example, optical system 200 may have an output with a narrow viewing angle in a vertical direction when switchable diffuser 220 is both the first and second states and may have a wide viewing angle output in a horizontal direction when switchable diffuser 220 is in a first state and a narrow viewing angle output in a horizontal direction when switchable diffuser 220 is in a second state. In other embodiments, optical system 200 may have a wide viewing angle output in both a vertical and a horizontal direction when switchable diffuser 220 is in a first state and a narrow viewing angle output in both a vertical and a horizontal direction when switchable diffuser 220 is in a second state.

Diffuser data channel 241 is configured to provide diffuser state data and switching signals to switchable diffuser 220. In some embodiments, the diffuser controller 240 is implemented using a CPU in a computer. In some embodiments, the diffuser controller 240 is implemented using a microcontroller unit disposed in a monitor. The system is configured such that the diffuser controller 240 is capable of sending a signal or signals to the switchable diffuser on diffuser data channel 241 to cause the switchable diffuser 220 to change states.

In some embodiments, one or more of optional optical films 270, 275 and 280 includes a louver film which partially collimates light output from the light guide 260 to the display panel 230. When the switchable diffuser 220 is in a substantially clear state, the partially collimated light that passes through switchable diffuser 220 is still partially collimated when it reaches display panel 230. The output from the display panel is then partially collimated so that it provides a light output in a narrow viewing angle mode. When the switchable diffuser is in a hazy state, the partially collimated light is partially diffused by the switchable diffuser resulting in a less collimated light reaching the display panel 230.

As noted elsewhere, louver films absorb light at off-normal incidence and can therefore be inefficient when used in a recycling backlight. In some embodiments, optional optical films 270, 275 and 280, if included, are low-absorbing films. Embodiments making use of low-absorbing films are discussed further elsewhere.

In some embodiments, the switchable diffuser has one or more regions that are independently addressable. Each region is capable of being in a first state or a second state different from the first state. For example, the first state may be a hazy state and the second state may be a substantially clear state. In some embodiments, each region is capable of being in a first state, a second state different from the first state and a third state different from the first and the second state. For example, the first state may be a first hazy state having a first haze, the second state may be a second hazy state having a second haze different from the first haze, and the third state may be a substantially clear state. In some embodiments, each region is capable of being in a substantially clear state and a first hazy state. In some embodiments, each region is capable of being in a substantially clear state, a first hazy state and a second hazy state different from the first hazy state. In some embodiments, each region can be in a maximum haze state having the maximum haze that can be achieved by the switchable diffuser. In some embodiments, each region can be in any of a substantially clear state and a plurality of hazy states that can be varied substantially continuously from the substantially clear state to the maximum haze state.

Figure 3:
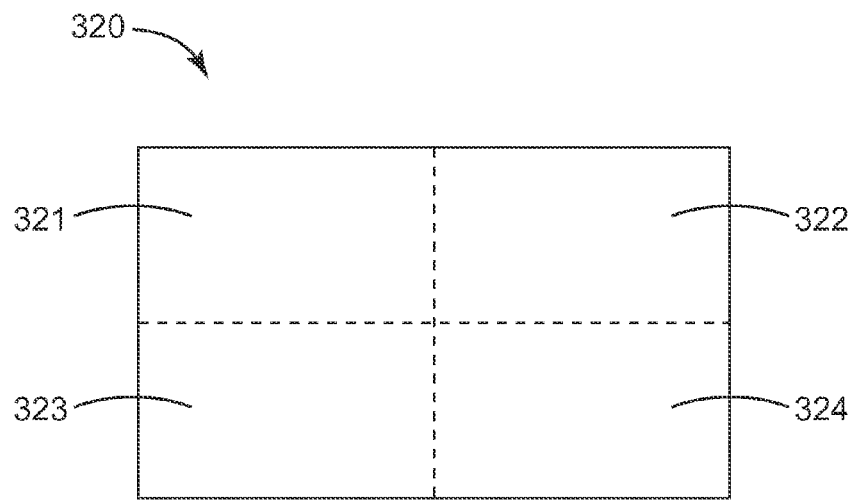
FIG. 3 is a front view of a switchable diffuser.

In some embodiments, the one or more regions of the switchable diffuser include at least four regions that are passive matrix addressable. An electrically switchable diffuser having a plurality of addressable regions as illustrated in FIG. 3 which shows switchable diffuser 320 having independently addressable regions 321, 322, 323 and 324. In the embodiment illustrated in FIG. 3, the four regions 321-324 are arranged in a rectangular array of regions. In other embodiments, the regions are arranged as adjacent stripes, each of which may extend along a length or a width of a display.

As used herein, "diffuser state" or "state of the diffuser" refers to the state of the switchable diffuser overall and includes the state of each region of the switchable diffuser. For example, in the embodiment illustrated in FIG. 3, switchable diffuser 320 has four independently addressable regions, 321-324, and the state of each region may be characterized by the haze value for that region. The haze value of each region can be denoted $h_i$ for i=1, 2, 3 or 4. In this case, the diffuser state may be characterized by an ordered 4-tuple ($h_1$, $h_2$, $h_3$, $h_4$). Similarly, in some embodiments the switchable diffuser has n addressable regions and the diffuser state can be characterized by an ordered n-tuple of haze values. A change in state of the switchable diffuser means that at least one region of the switchable diffuser changes state.

Haze can be defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which complies with the ASTM D1003-13 standard.

A voltage waveform may be applied to a switchable diffuser in order to change the state of the diffuser. In some embodiments, the waveform is applied using a switching device. In some embodiments, a switching device is provided as a component of the switchable diffuser. In some embodiments, a switching device may be disposed in a display housing containing the switchable diffuser. In some embodiments, a switching device may be provided as a physically separate component located exterior to a display housing that contains the switchable diffuser. In some embodiments, the switchable diffuser includes a layer of smectic A material. In some embodiments, the thickness of the smectic A material is in a range of 5 microns to 20 microns.

Figure 16:
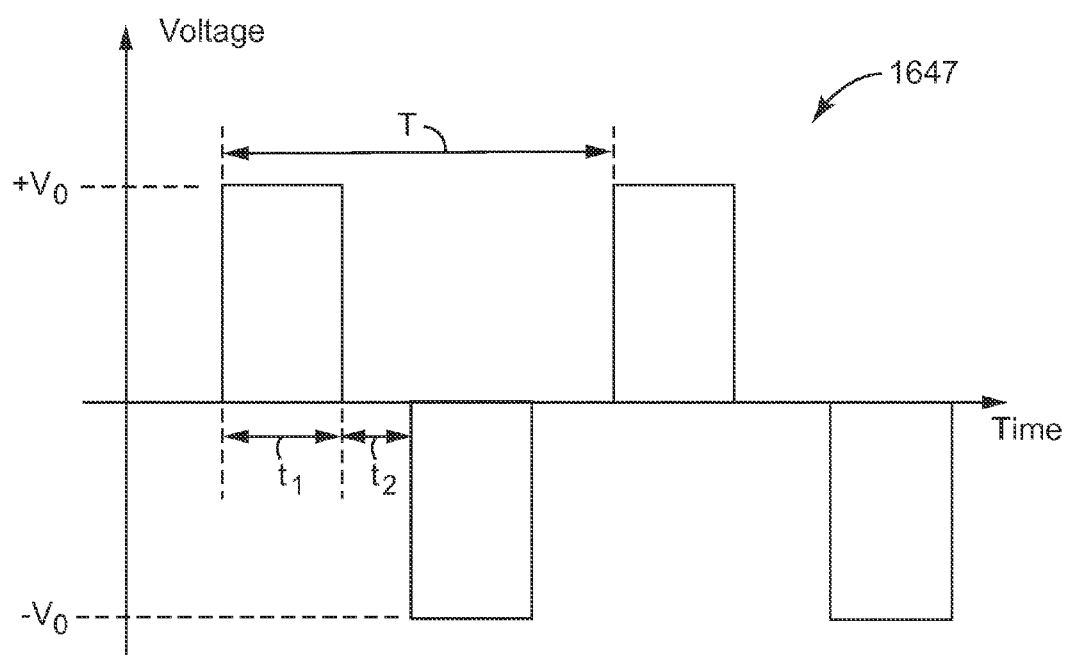
FIG. 16 is a graph of a portion of a switching waveform.

Voltage waveforms needed to cause smectic A material, or other switchable diffuser material, to change states are known in the art. Suitable waveforms are described, for example, in U.S. Pat. No. 4,893,117 (Blomley et al.). A portion of a switching waveform 1647 is shown schematically in FIG. 16 where a rectangular wave voltage waveform having a peak voltage $V_0$ is illustrated. The voltage is applied for a time $t_1$ from the start of a rectangular wave to the time where the rectangular wave voltage returns to zero and with a period T from the start of a first positive rectangular wave to the start of the second positive rectangular wave. In the embodiment illustrated in FIG. 16, the voltage is substantially zero for a time $t_2$ before a negative voltage rectangular wave is applied. In other embodiments, the time $t_2$ may be zero or substantially zero so that the voltage transitions directly from a positive value to a negative value. The period defines a frequency, f, as the inverse of the period (i.e., f=1/T). In some embodiments, the switching waveform used to change the state of the switchable diffuser is a rectangular wave signal having a peak to peak voltage amplitude ($2V_0$) in the range of about 150 V to about 350 V (for example, about 220 V).

In some embodiments, a low-frequency waveform is applied to switch regions from a clear state to a haze state and a high-frequency waveform is used to switch regions from a hazy state to a clear state. In some embodiments, the low-frequency waveform has a frequency in the range of about 10 Hz to about 100 Hz (for example, about 50 Hz). In some embodiments, the high-frequency waveform has a frequency in the range of about 0.5 kHz to about 4 kHz (for example, about 1 kHz).

The hazy state can be adjusted by the time that the voltage waveform is applied to the switchable diffuser in the clear state. For example, a low-frequency waveform applied to a switchable diffuser in the substantially clear state for a first time period can result in a first hazy state having a first haze and a low-frequency waveform applied to a switchable diffuser in the substantially clear state for a second time period can result in a second hazy state having a second haze that is different from the first haze. For example, the first time period can be 800 ms and the second time period can be 400 ms resulting in a first haze that is higher than the second haze.

In some embodiments, when the switchable diffuser is in a state where some regions are in a clear state and some regions are in a hazy state and both clear to hazy and hazy to clear state changes are needed, the diffuser controller is configured to first apply a low-frequency waveform to those regions that are to be changed from a clear state to a hazy state followed by applying a high-frequency waveform to those regions that are to be changed from a hazy state to a clear state. In some embodiments, when the switchable diffuser is in a state where some regions are in a clear state and some regions are in a hazy state and both clear to hazy and hazy to clear state changes are needed, the diffuser controller is configured to first apply a high-frequency waveform to those regions that are to be changed from a hazy state to a clear state followed by applying a low-frequency waveform to those regions that are to be changed from a clear state to a hazy state. In some embodiments, when the switchable diffuser is in a state where some regions are in a clear state and some regions are in a hazy state and both clear to hazy and hazy to clear state changes are needed, the diffuser controller is configured to apply a low-frequency waveform to those regions that are to be changed from a clear state to a hazy state in a first time period and apply a high-frequency waveform to those regions that are to be changed from hazy state to a clear state in a second time period where the first time period and the second time period overlap.

Figure 4:
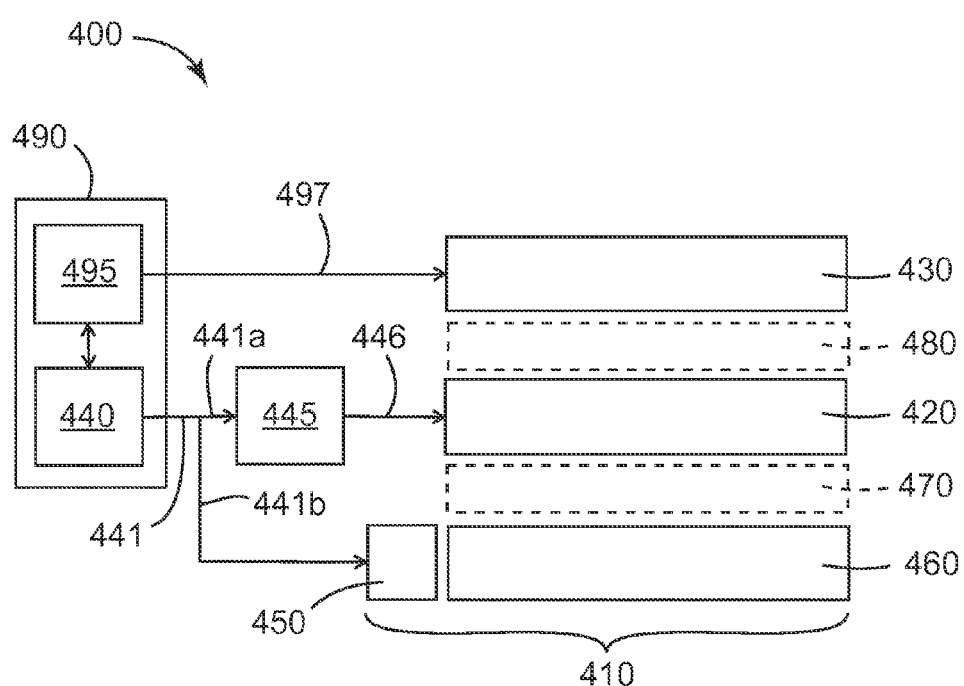
FIG. 4 is a side view of an optical system.

FIG. 4 is a side view of optical system 400 including lighting component 410, electrically switchable diffuser 420, display panel 430, diffuser controller 440, which provides diffuser state data to switchable diffuser 420 on diffuser data channel 441, and switching device 445, which is capable of providing a switching signal 446 to switchable diffuser 420. Lighting component 410 includes light source 450 and light guide 460. Optical system 400 can also include optional first optical film 470 and/or optional second optical film 480. Optical system 400 also includes computer 490 and video controller 495. Video controller 495 and diffuser controller 440 can exchange information. Video controller 495 is configured to provide display information to display panel 430 in video data channel 497 and diffuser controller 440 is configured to provide diffuser state information to the switchable diffuser on diffuser data channel 441. In the embodiment illustrated in FIG. 4, diffuser data channel 441 and video data channel 497 are separate data channels. In other embodiments, a common data channel may be used to output both video and diffuser data from computer 490. In the embodiment illustrated in FIG. 4, the switchable diffuser 420 is disposed between the display panel 430 and the light guide 460. In other embodiments, the light guide is disposed between the display panel and the switchable diffuser and a reflector is disposed adjacent the switchable diffuser opposite the light guide.

Diffuser data channel 441 includes diffuser data sub-channel 441a, which provides diffuser state data and state change commands to switching device 445, and lighting level sub-channel 441b which provides lighting level data and lighting level commands to light source 450. Lighting level sub-channel 441b allows the diffuser controller 440 to adjust the output level of the display by varying the lighting level of lighting component 410. In some embodiments, diffuser controller 440 can adjust the output level of the display by sending a command to the video controller 495 to alter the video content provided on video data channel 497. In some embodiments, diffuser controller 440 alters the video content by inserting black or dark frames into the video content provided on video data channel 497. In some embodiments, the diffuser controller 440 is configured to vary the output level of the display by altering a video content provided to regions of the display panel 430 that are in a substantially clear state when the switchable diffuser initiates a state change from a first diffuser state to a second diffuser state. In some embodiments, diffuser controller 440 can adjust the output level of the display by both varying the lighting level of lighting component 410 and by inserting dark frames into the video content. As discussed elsewhere, it may be desirable for the diffuser controller to alter the output level of the display panel while the switchable diffuser is changing states.

In the embodiment shown in FIG. 4, the diffuser controller 440 outputs a control signal to the lighting component on the same data channel (diffuser data channel 441) used for controlling the switchable diffuser 420. This can be useful when adding a switchable diffuser to a system that already has a data channel for controlling the lighting component. In this case, the existing data channel can be modified to include data and control signals for the switchable diffuser. In other embodiments, the diffuser controller 440 sends a control signal for lighting component 410 to video controller 495 which outputs the control signal on video data channel 497.

In some embodiments, a separate computer 490 is not used. Rather, the diffuser controller 440 may be implemented using an embedded controller (e.g., a microcontroller unit) disposed in a monitor and the video controller 495 may be implemented using a video scaler or a video chip disposed in the monitor.

In some embodiments, switching device 445 may be disposed in a display housing containing switchable diffuser 420. In other embodiments, switching device 445 may have a switching device housing that is separate from the display housing containing switchable diffuser 420.

Figure 5A:
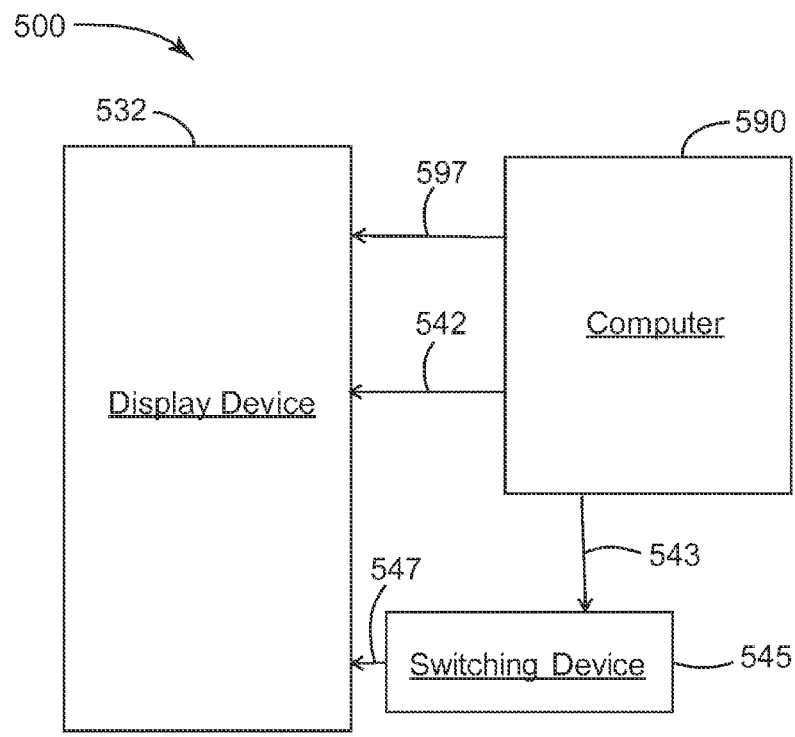
FIGS. 5A and 5B are block diagrams of an optical system.
Figure 5B:
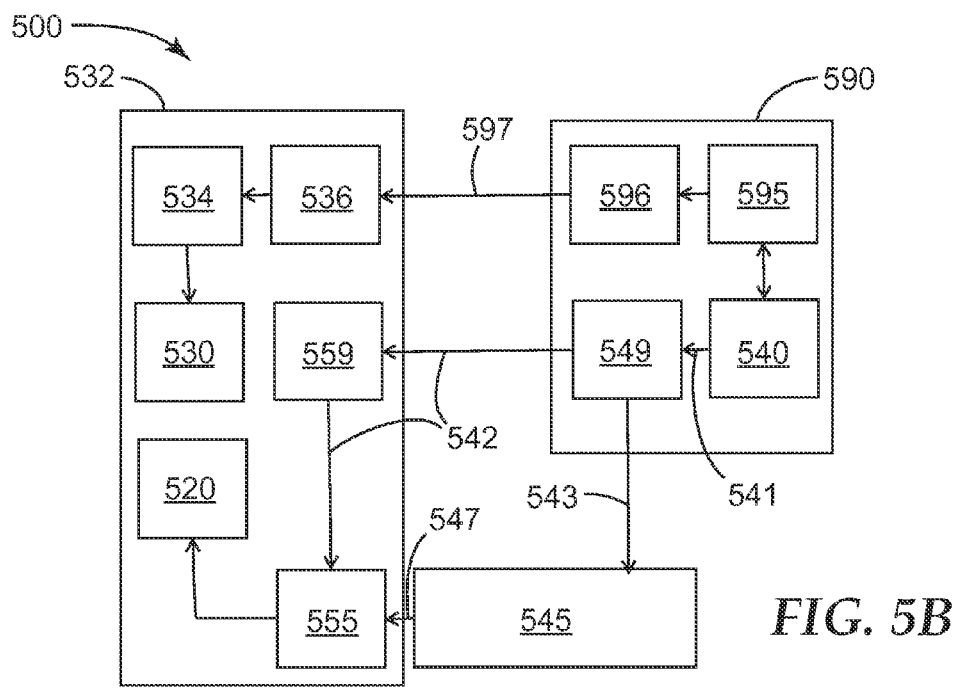

FIG. 5A is a high-level block diagram of optical system 500 and FIG. 5B is a more detailed block diagram of optical system 500. Optical system 500 includes electrically switchable diffuser 520 and display panel 530 disposed in display device 532 which also includes scaler board 534 and display signal interface 536. Optical system 500 also includes diffuser controller 540, which provides diffuser state data and control information to switchable diffuser 520 via first diffuser data channel 541, second diffuser data channel 542 and third diffuser data channel 543. Optical system 500 also includes switching device 545, which is capable of producing a switching waveform 547. Output component 549 receives first diffuser data channel 541 and outputs second and third diffuser data channels 542 and 543, respectively. Switching waveform 547 is provided to waveform transfer unit 555 which also receives second diffuser data channel 542 by way of input component 559. Switching device 545 produces a switching waveform 547 in response to a command received on third diffuser data channel 543. Waveform transfer unit applies the switching waveform to the switchable diffuser or portions of the switchable diffuser when a command is received on second diffuser data channel 542 and the switching waveform 547 is present. In embodiments where the switchable diffuser is a single switchable element, second diffuser data channel 542 may be omitted and waveform transfer unit 555 may apply any received waveform to switchable diffuser 520. In embodiments where the switchable diffuser includes a plurality of addressable regions, second diffuser data channel 542 may be used to provide information to waveform transfer unit 555 on which regions to apply the waveform.

Computer 590 includes diffuser controller 540, output component 549, video controller 595 and video card 596. Video controller 595 provides display information to display device 532 by providing content to video card 596 which outputs the content on video data channel 597 which is received by display signal interface 536.

In some embodiments, scaler board 534 is not included. For example, some mobile devices do not include a scaler board. In some embodiments, third data channel 543 is not included and instead switching device has buttons, switches, touch panel inputs or the like that allows a user to switch the states of the switchable diffuser.

In some embodiments, switching waveform 547 is a waveform created by switching device 545 and waveform transfer unit 555 receives the waveform from switching device 545 and diffuser state data from second diffuser data channel 542.

In some embodiments, computer 590 and display device 532 are located in the same display housing, for example, in a tablet computer. In other embodiments, computer 590 is in a computer housing, for example a desktop computer housing, and display device 532 is in a display housing separate from the computer housing. In some embodiments, switching device 545 is positioned in a switching device housing which may be a dock separate from a display housing containing display device 532.

Second diffuser data channels 542 may connect computer 590 and display device 532 by way of any wired or wireless connection. Third diffuser data channel 543 may connect computer 590 and switching device 545 by way of any wired or wireless connection. Suitable connection methods include using a multimaster serial single-ended computer bus (e.g., I2C), a serial peripheral interface (SPI), a system management bus (SMB), a communications bus system containing only one wire in addition to ground (e.g., 1-Wire), a universal serial bus (USB), an RS-232 serial port, data transfer using radio waves, which may, for example, be radio waves in the band from 2.4 to 2.485 GHz (e.g., BLUETOOTH), infrared (IR) data transfer, radio frequency (RF) data transfer, a Local Area Network (LAN), a WI-FI connection or a combination thereof.

Figure 6:
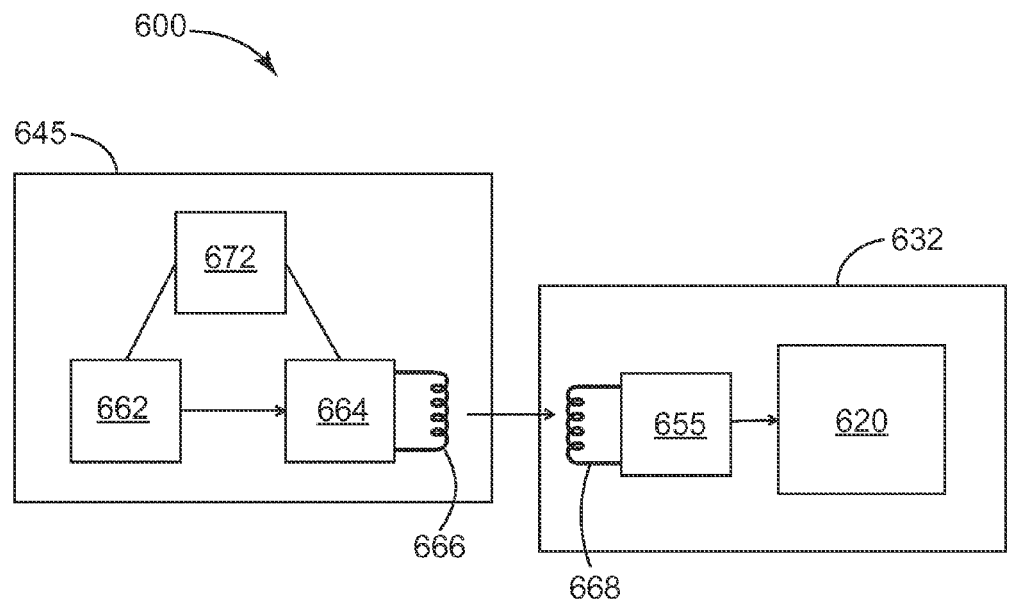
FIG. 6 is a block diagram of an optical system.

FIG. 6 is a block diagram of optical system 600 illustrating electrically switchable diffuser 620 disposed in display device 632 which is separate from switching device 645. Display device 632 may be a monitor, a tablet or other device that provides a display. Display device 632 includes waveform transfer unit 655 which receives a switching waveform from switching device 645 and applies the switching waveform to switchable diffuser 620. Switching device 645 also includes pattern generator 662 which applies a pattern to a waveform generation unit 664. Waveform generation unit 664 applies a waveform to transmitting coil 666 and this waveform is received by receiving coil 668 which is coupled to waveform transfer unit 655 in display device 632. Switching device 645 includes power supply 672 which provides power to pattern generator 662 and waveform generation unit 664. The power required to switch diffuser states is provided to switchable diffuser 620 from power supply 627 via inductive coupling from transmitting coil 666 to receiving coil 668. In other embodiments, direct electrical contact is made between switching device 645 and display device 632 rather than utilizing inductive coupling.

Figure 7:
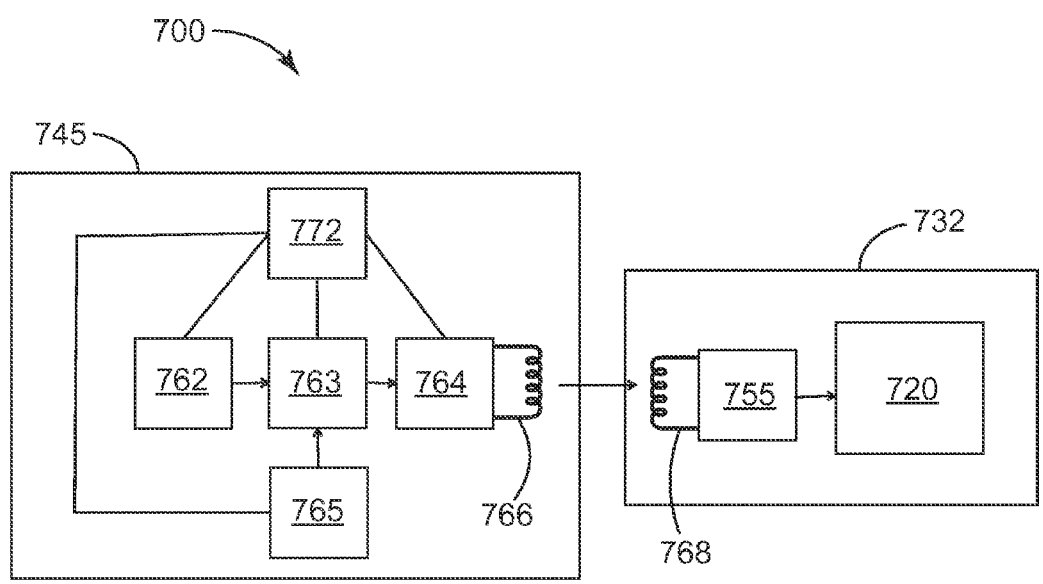
FIG. 7 is a block diagram of an optical system.

FIG. 7 is a block diagram of optical system 700 illustrating switchable diffuser 720 disposed in display device 732 which is separate from switching device 745. Display device 732 may be a monitor, a tablet or other device that provides a display. Display device 732 includes demodulator/waveform transfer unit 755 which receives a modulated waveform from switching device 745, demodulates the modulated waveform and applies the demodulated waveform to switchable diffuser 720. Switching device 745 also includes pattern generator 762 which provides a pattern signal to modulator 763 which them applies a modulated signal to waveform generation unit 764. A carrier signal is provided to modulator 763 from carrier generator 765. Waveform generation unit 764 applies a modulated waveform to transmitting coil 766 and this modulated waveform is received by receiving coil 768 which is coupled to demodulator/waveform transfer unit 755 in display device 732. Switching device 745 includes power supply 772 which provides power to pattern generator 762, modulator 763, waveform generation unit 764 and carrier generator 765. The power required to switch diffuser states is provided to switchable diffuser 720 from power supply 772 via inductive power transfer from transmitting coil 766 to receiving coil 768. In other embodiments, direct electrical contact is made between switching device 745 and display device 732 rather than utilizing inductive power transfer. Demodulator/waveform transfer unit 755 includes a demodulator which demodulates the waveform received from switching device 745 and applies a demodulated waveform to switchable diffuser 720.

Figure 8A:
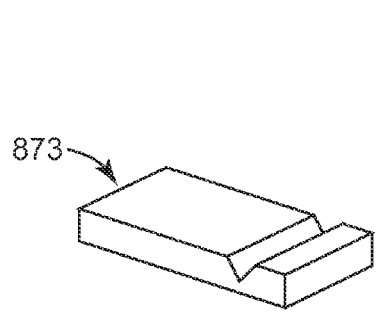
FIG. 8A is a perspective view of a dock.
Figure 8B:
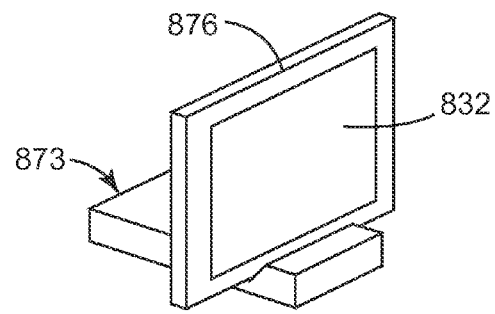
FIG. 8B is a perspective view of a tablet disposed in the dock of FIG. 8A.

In some embodiments, display device 632 or display device 732 is in a display housing. Switching device 645 or 745 is capable of applying a switching waveform to the switchable diffuser when the display housing is in at least one position proximate the switching device. In some embodiments, the switching device is separable from the display housing. In some embodiments, the switching device is housed in a dock and the display housing is attachable to and detachable from the dock. For example, the display housing may be a tablet computer and the switching device may be contained in a tablet dock. This is schematically illustrated in FIG. 8A which shows dock 873 and in FIG. 8B which shows tablet 832 including display housing 876 disposed adjacent dock 873. Tablet docks are known in the art. For example a THINKPAD Tablet Dock is available from Lenovo Group Ltd. (Beijing, China) and the DELL Tablet Dock is available from DELL Inc. (Round Rock, Tex.). In other embodiments, the dock may include a keyboard that can be attached to or detached from a tablet computer. Keyboard docks are known in the art. For example, the Acer Iconia W4 tablet (Acer Inc., Taipei, Taiwan) is available with a keyboard dock.

When the switching device is housed in a dock, it is preferable that the electrically switchable diffuser be bistable so that switchable diffuser can be in either a substantially clear state or a hazy state without having an applied voltage. As used herein, a "bistable" switchable diffuser is an electrically switchable diffuser having one or more regions where each region has two or more states that are substantially stable. "Substantially stable" means that the states are maintained over a time period, such as hours or days, without a voltage applied across the switchable diffuser. In some embodiments, the switchable diffuser includes smectic A liquid crystal which is bistable. Electrically switchable diffusers using smectic A liquid crystal have a stable substantially clear state, and a plurality of stable hazy states that can be characterized by the haze value in the various hazy states.

The switching speed of some types of switchable diffusers can be slow enough to be objectionable to some users. It has been found that if the output level of the display is varied as the switchable diffuser changes state, the switching speed is less objectionable and in some cases a desirable optical effect can be created. In some embodiments, the diffuser controller is configured to adjust the output level of the display during the change of state of the diffuser. As discussed elsewhere, this can be accomplished by varying the output level of the backlight, by inserting dark frames into the display output, or by a combination of these techniques.

Figure 9:
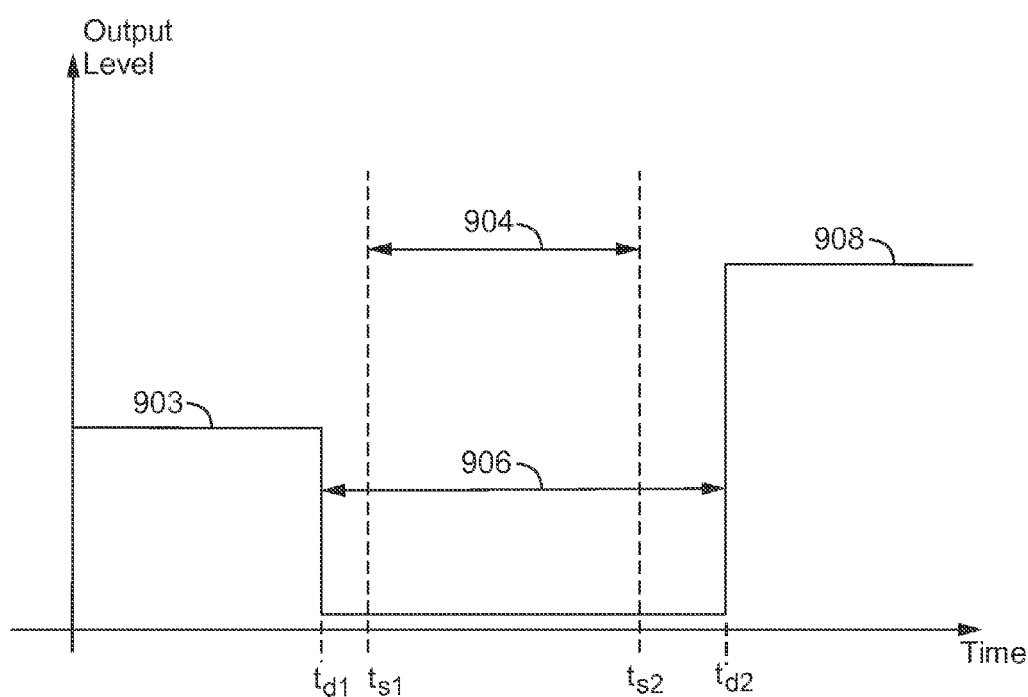
FIG. 9 is a graph of output level versus time.

FIG. 9 shows the output level of a display panel as a function of time. The display panel has an initial output level 903, the switchable diffuser changes states over a first time period 904 starting at a time $t_{s1}$ and ending at a time $t_{s2}$, the output level is dimmed over a second time period 906 starting at a time $t_{d1}$ and ending at a time $t_{d2}$, and the output level is set to a final output level 908 after the time $t_{d2}$. The second time period 906 overlaps with the first time period 904. In the embodiment shown in FIG. 9, the final output level 908 is higher than the initial output level 903. This may be desired in some cases when the switchable diffuser changes state from a substantially clear state to a hazy state since a higher overall light output is needed in this case if the perceived on-axis brightness is to be maintained after switching. In the embodiment shown in FIG. 9, the output level is reduced prior to initiating the diffuser state change and the output level is not elevated until after the diffuser has changed states. In other embodiments, the dimming of the output level may not start until after the state change has been initiated or may end before the state change has been completed.

Figure 10:
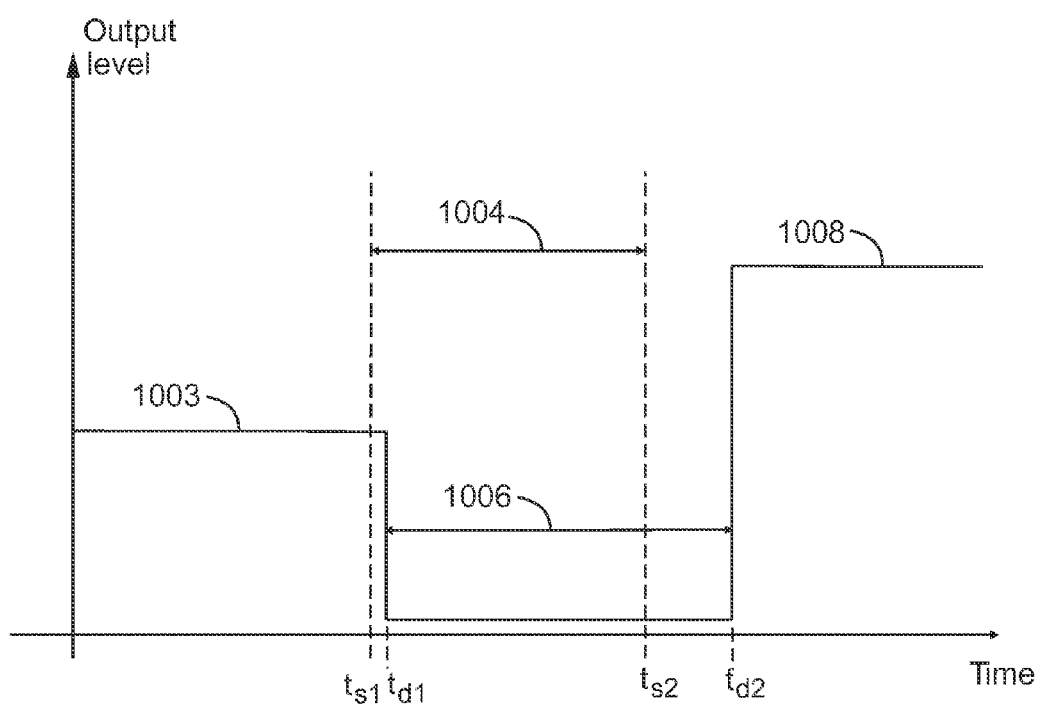
FIG. 10 is a graph of output level versus time.

FIG. 10 shows the output level of a display panel as a function of time. The display panel has an initial output level 1003, the switchable diffuser changes states over a first time period 1004 starting at a time $t_{s1}$ and ending at a time $t_{s2}$, the output level is dimmed over a second time period 1006 starting at a time $t_{d1}$ and ending at a time $t_{d2}$, and the output level is set to a final output level 1008 after the time $t_{d2}$. The second time period 1006 overlaps with the first time period 1004. In the embodiment shown in FIG. 10, the output level is reduced after initiating the diffuser state change and the output level is not elevated until after the diffuser has changed states.

As discussed elsewhere, the output variation level shown in FIG. 9 or 10 can be achieved by varying the lighting level provided by the lighting component and/or by varying the video content (e.g., black frame insertion) provided to the display panel. For example, in some embodiments the diffuser controller is configured to set the lighting component at a first lighting level prior to varying the output level of the display and at a second lighting level different from the first lighting level after varying the output level of the display panel.

In some embodiments, the dimming illustrated in FIGS. 9 and 10 is only implemented if one or more regions change state from a substantially clear state to a hazy state. In some embodiments, the variation in output level exemplified in FIGS. 9 and 10 is implemented for at least one diffuser state change. In some embodiments, when the switchable diffuser changes from a first diffuser state to a second diffuser state, the diffuser controller is configured to vary the output level in association with diffuser state changes when at least one region is in a substantially clear state when the switchable diffuser is in the first diffuser state. In some embodiments, the output level is varied by steadily varying the output level from an initial level to a final level without a dimming phase. In still other embodiments, the switchable diffuser changes states over a first time period and the output level is varied by a fading in and out of the output level over a second time period that overlaps with the time period. The fading in and out of the output level may be a substantially continuous variation or it may be a blinking variation where the output level is high for relatively brief intervals between longer intervals where the output level is low. Such variation in the output level can be distracting to the user so that the user's attention is not focused on a transition between first and second diffuser states.

In some embodiments, the diffuser controller is configured to determine if the state of the switchable diffuser should be changed from a first diffuser state to a second diffuser state and the switchable diffuser is further configured to determine whether or not the switching device is in the one or more positions proximate the display housing. For example, the diffuser controller may determine that the state of the switchable diffuser should be changed if the diffuser controller determines that content should be displayed in a narrow viewing angle mode but the switchable diffuser is in a wide viewing angle mode. In some cases, the switchable diffuser may determine that the state of the switchable diffuser should be changed, but the state cannot be changed because the switching device is not in the one or more positions proximate the display housing. In some embodiments, the diffuser controller is configured to execute an error handling process when the diffuser controller determines that the display housing is not in any of the at least one positions proximate the switching device and the diffuser controller determines that the first diffuser state of the switchable diffuser should otherwise be changed. If the diffuser controller determines that the state of the switchable diffuser should be changed and if the switchable diffuser determines that the switching device is in the one or more positions proximate the display housing, the switchable diffuser determines that the state of the switchable diffuser is to be changed and it sends the appropriate commands to the diffuser controller to cause the state to be changed. In some embodiments, the diffuser controller is configured to vary the output level in association with at least one diffuser state change. An example process that can be carried out by the diffuser controller is illustrated in FIG. 11.

Figure 11:
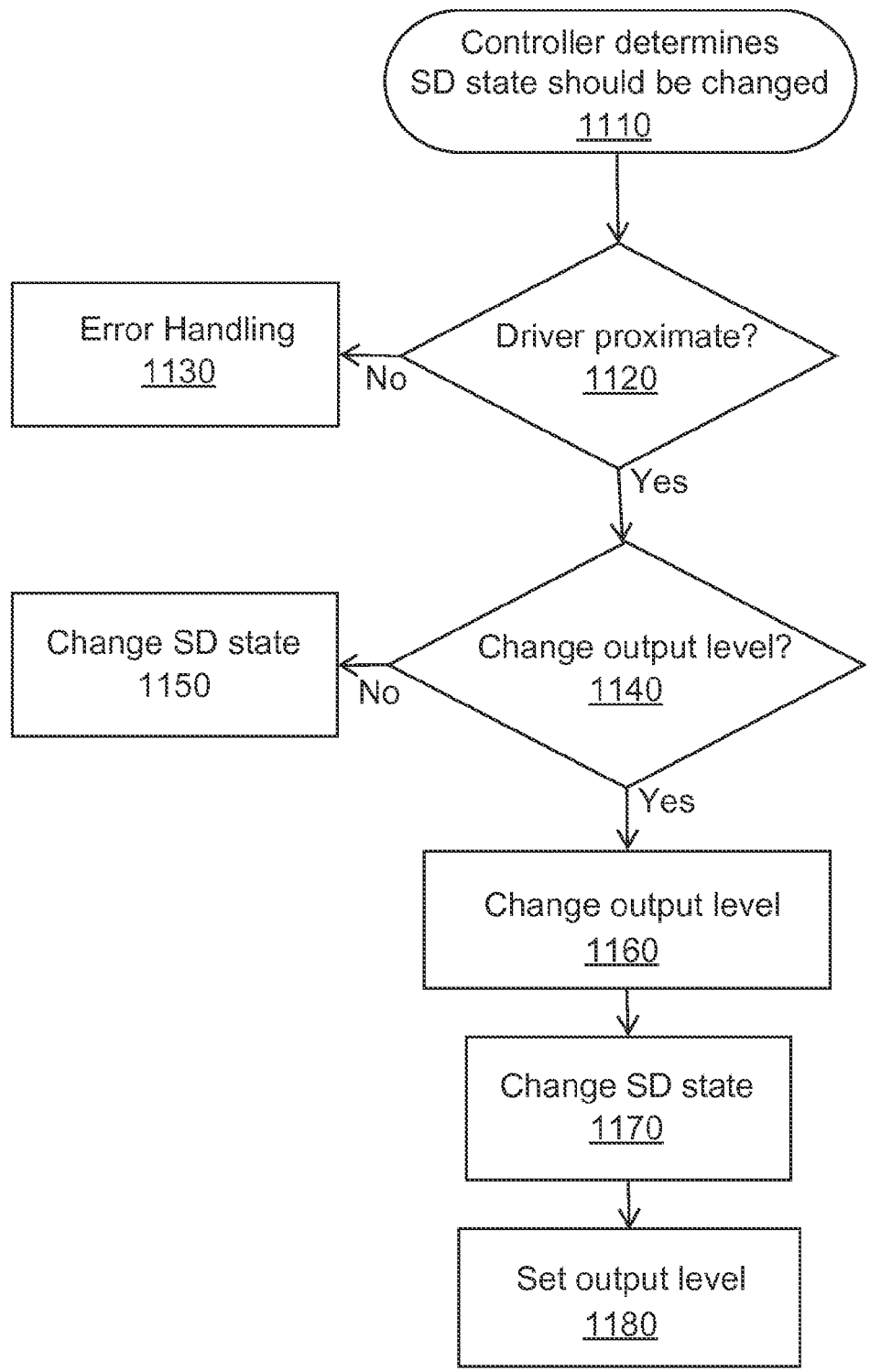
FIG. 11 is a flow diagram of a process executed by a diffuser controller.

FIG. 11 is a flow diagram illustrating a process 1100 that the diffuser controller may implement. In step 1110, the diffuser controller determines that the state of the switchable diffuser should be changed. In step 1120, the diffuser controller determines whether or not the switching device is in the one or more positions proximate the display housing. If the diffuser controller determines that the switching device is not in the one or more positions, the diffuser controller executes an error handling process 1130. In some embodiments, the error handling process 1130 includes providing a message on the display panel. For example, a message such as "Please Connect the Switching Device," can be provided to the user. If the switching device is in the one or more positions proximate the display housing, the diffuser controller the determines that that the state of the diffuser is to be changed and executes step 1140 where the diffuser controller determines if a change in the output level of the display panel should be implemented with the change of state. For example, the switching time for some types of switchable diffuser in going from a second state to a first state is longer than the switching time in going from the first state to the second state. So in some embodiments, the diffuser controller is configured to vary the output level of the display when one or more regions of the display are changed from the second state to the first state. In some embodiments, the second state is a substantially clear state and the first state is a hazy state. In some embodiments, the diffuser controller will insert dark frames in only those regions that are changing from a substantially clear state to a hazy state. In some embodiments, the switchable diffuser includes smectic A liquid crystal which takes longer to switch from a substantially clear state to a hazy state than from a hazy state to a substantially clear state.

If the diffuser controller determines that a change in the output level of the display panel is not needed, step 1150 is executed and the state of the switchable diffuser is changed. If the diffuser controller determines that the output level of the display panel should be changed, the diffuser controller executes step 1160 and changes the output level of the display panel. Then step 1170 is executed and the diffuser controller changes the state of the switchable diffuser. Next, step 1180 is executed and the diffuser controller sets the output level of the display panel. In the embodiment illustrated in FIG. 11, the output level is changed and then the state of the switchable diffuser is changed. In other embodiments, other time sequences are possible as discussed elsewhere. In some embodiments, the output level is set to a level that is the same as the output level prior to executing process 1100. In some embodiments, the output level is set to a level that is higher or lower than the output level prior to executing process 1100. In some embodiments, when the change of state is associated with an increase in the average haze of the switchable diffuser, the output level of the display panel after changing the state of the switchable diffuser is set to a higher value than the output level of the display panel prior to changing the state of the switchable diffuser. Similarly, in some embodiments, when the change of state is associated with an decrease in the average haze of the switchable diffuser, the output level of the display panel after changing the state of the switchable diffuser is set to a lower value than the output level of the display panel prior to changing the state of the switchable diffuser.

In some embodiments, the first state is a hazy state and the output from the display in regions where the switchable diffuser is in the first state has a wide viewing angle suitable for displaying shared content. In some embodiments, the second state is a substantially clear state and the output from the display in regions where the switchable diffuser is in the second state has a narrow viewing angle suitable for displaying private content.

In some embodiments, content to be displayed is combined with a data tag indicating whether the content should be displayed in a narrow viewing angle mode, which would be appropriate for private content, or whether the content should be displayed in a wide viewing angle mode, which would be appropriate for shared content. In some embodiments, the diffuser controller is configured to mark content as private or shared. In some embodiments, the diffuser controller includes algorithms executed on a first computer. In some embodiments, a second computer provides content with a data tag indicating whether the content should be displayed in a narrow viewing angle mode or whether the content should be displayed in a wide viewing angle mode, and the tagged data is provided to the first computer.

Content may be marked as private (i.e., to be displayed in a narrow viewing angle mode) or shared (i.e., to be displayed in a wide viewing angle mode) based on various criteria. For example, the content may include a data mark, such as a confidential mark. If the content includes a data mark indicating that the content is confidential, the diffuser controller may be configured to display the content in a private mode. The data mark may be a bit, byte or data segment in a data package containing the content. In some embodiments, the data mark contains data specifying a viewing angle mode in which the content should be displayed. The viewing angle mode may be in a range from a widest achievable viewing angle mode to a narrowest achievable viewing angle mode and the diffuser controller may be configured to place the switchable diffuser in various haze states between a substantially clear state and a highest achievable haze state based on the viewing angle mode provided in the data mark. This may be useful for displays used in advertising where an advertiser could set a preference for the viewing angle to be used to display the advertiser's content.

In some embodiments, content may be determined to be private or shared based on key words or other information contained in the content data. For example, if certain words or phrases appear in the content, the diffuser controller may be configured to display that content in a private mode.

In some embodiments, the diffuser controller is configured to perform an image analysis on image content to determine if confidential information or other information that should be displayed in a narrow viewing angle mode is present in the image content. If the diffuser controller determines that such information is present, the diffuser controller may be configured to set the switchable diffuser to a diffuser state such that the content is displayed in a narrow viewing angle mode.

In some embodiments, the diffuser controller is configured to set the switchable diffuser so that the system displays content in a narrow viewing angle mode if the diffuser controller determines that the current time is within a certain range. In some embodiments, the diffuser controller is implemented using a computer and software running on the computer can provide the current time to the diffuser controller. In some embodiments, the diffuser controller determines that all content displayed during normal working hours, for example, is to be displayed in a narrow viewing angle mode.

In some embodiments, the diffuser controller is configured to determine that the content should be displayed in a narrow viewing angle mode if the diffuser controller determines that the content contains information from a secure internet address, for example, an internet address starting with https. In some embodiments, the diffuser controller is configured to determine that the content should be displayed in a narrow viewing angle mode if the diffuser controller determines that the content is signed or encrypted, for example, by a Secure Socket Layer (SSL) certificate.

In some embodiments, the system is configured such that the user can select regions of the display panel to designate as private. In some embodiments, the system includes a computer and a computer monitor that includes the display panel. Software running on the computer can be used to provide an interface to a user so that the user can select a region or regions of the display panel to designate as private. In some embodiments, the computer runs an operating system that allows a plurality of windows to be presented to the display panel and the system allows the user to designate one or more windows in the plurality of windows to designate as private. In some embodiments, the system is configured such that a user may designate the entire display panel as private or may designate the entire display panel as shared. The diffuser controller may be configured to set the switchable diffuser to a diffuser state such that content displayed in regions designated as private are displayed in a narrow viewing angle mode and such that content displayed in regions that have not been designated as private or that have been designated as public are displayed in a wide viewing angle mode.

In some embodiments, the optical system is configured to detect the presence of an object that can identify a person or persons. For example, the object may be a cell phone with BLUETOOTH or an RFID tag contained in a user's identification card. In some embodiments, the diffuser controller is configured to set the switchable diffuser such that content is displayed in a wide viewing angle mode if only a designated user or designated users are detected near the system and the diffuser controller is configured to set the switchable diffuser such that content is displayed in a narrow viewing angle mode if any non-designated users are detected near the optical system.

In some embodiments, the optical system includes a camera that is capable of detecting the presence of a primary viewer and any secondary potential viewers in the vicinity of the primary viewer. In some embodiments, the diffuser controller is configured to set the switchable diffuser such that content is displayed in a wide-viewing angle mode if no secondary potential viewers are detected near the optical system and the diffuser controller is configured to set the switchable diffuser such that content is displayed in a narrow viewing angle mode if secondary potential viewers are detected near the optical system.

In some embodiments, the diffuser controller is configured to set the switchable diffuser to a diffuser state such that content is displayed in a narrow viewing angle mode or in a wide viewing angle mode when the diffuser controller determines that the optical system is in certain specified geographic regions. In some embodiments, the system includes a computer that is connected to the internet and the computer determines geographic region from the IP address associated with the internet access. In some embodiments, the system is included in a wireless tablet or cell phone that is capable of receiving data from a cellular network. In some embodiments, the system determines geographic information from the cellular network. In some embodiments the system includes a spatial or three dimensional positioning system, such as a Global Positioning System receiver, that can be used to determine the geographic region. In some embodiments, the user inputs geographic data into the system. In some embodiments, the diffuser controller is configured to set the switchable diffuser to a diffuser state such that all content is displayed in a narrow viewing angle mode when the diffuser controller determines that the system is located in certain geographic regions, for example, when the diffuser controller determines that the system is not in a specified office location.

In some embodiments, the optical system includes a computer that is connected to the internet and the computer recognizes when it is connected to a secure network, for example, a company intranet, and the computer provides this information to the diffuser controller. In some embodiments, the diffuser controller is configured to set the switchable diffuser to a diffuser state such that all content is displayed in a wide viewing angle mode when the diffuser controller determines that the system is connected to a secure network. In some embodiments, the diffuser controller is configured to set the switchable diffuser to a diffuser state such that all content is displayed in a narrow viewing angle mode when the diffuser controller determines that the system is connected to a public network.

In some embodiments, the optical system is powered by a battery and the diffuser controller is configured to determine if the batter power is low. In some embodiments, the diffuser controller is configured to set the switchable diffuser to a narrow viewing angle mode when the switchable diffuser determines that the battery power is low. Since most of the light from the display is provided to the user in a narrow viewing angle mode, the backlight can be set to a lower level than in a wide viewing angle mode and still provide enough light to the user. A narrow viewing angle mode can therefore be used to conserve battery power.

In some embodiments, the optical system includes an accelerometer or other sensor that provides physical orientation data to the diffuser controller. In some embodiments, the diffuser controller is configured to display content in a narrow or a wide viewing angle mode based on the physical orientation of the optical system. For example, the diffuser controller may be configured such that a tablet computer has a first display mode when in a first orientation and a second display mode when in a second orientation.

In some embodiments, the diffuser controller is configured to control the diffuser state such that a content is displayed in a narrow viewing angle mode or a wide viewing angle mode based on whether the content includes a confidential mark, whether the content contains confidential key words, whether an image analysis indicates that the content contains confidential information, whether a current time determined by the diffuser controller is in a specified range, whether the content contains information from a secure internet address, whether the content is signed or encrypted, whether the content is to be displayed in a zone of the display panel that is designated as private, whether the content has been manually designated as private, whether the display panel is located in a specified geographic region, whether a power status is in a low state, whether the diffuser controller has detected the presence of non-primary viewers in a vicinity of a primary viewer, the physical orientation of the system, and combinations thereof.

In some embodiments, the lighting component includes a backlight capable of providing a light output that is at least partially collimated, the first state is a hazy state, the second state is a substantially clear state, and when the backlight provides the light output, the light output from the backlight that passes through the display panel and that passes through regions in the first state provides a first display output in a wide viewing angle mode and light output from the from the backlight that passes through the display panel and that passes through regions in the second state provides a second display output in a narrow viewing angle mode. In some embodiments, when some regions are in a narrow viewing angle mode and some regions are in a wide viewing angle mode, the diffuser controller is configured to provide a diffuser content to regions in a wide viewing angle mode (i.e., the regions of the switchable diffuser in the first state). The diffuser content refers to patterns or images produced by the switchable diffuser by varying the state in some regions of the switchable diffuser. The diffuser content is overlaid on any content provided by the display panel. In some embodiments, the diffuser content is selected from the group consisting of high contrast patterns, moving patterns, images, warnings and combinations thereof. The diffuser content may be chosen to distract the attention of unwanted viewers so that their eyes are not drawn to the content displayed in a narrow viewing angle mode.

In some embodiments, low-absorbing optical components are used in the system. An embodiment of a system having the general structure of optical system 100 of FIG. 1 where optional first optical film 170 is not included and optional second optical film 180 is a turning film is illustrated in FIG. 12.

Figure 12:
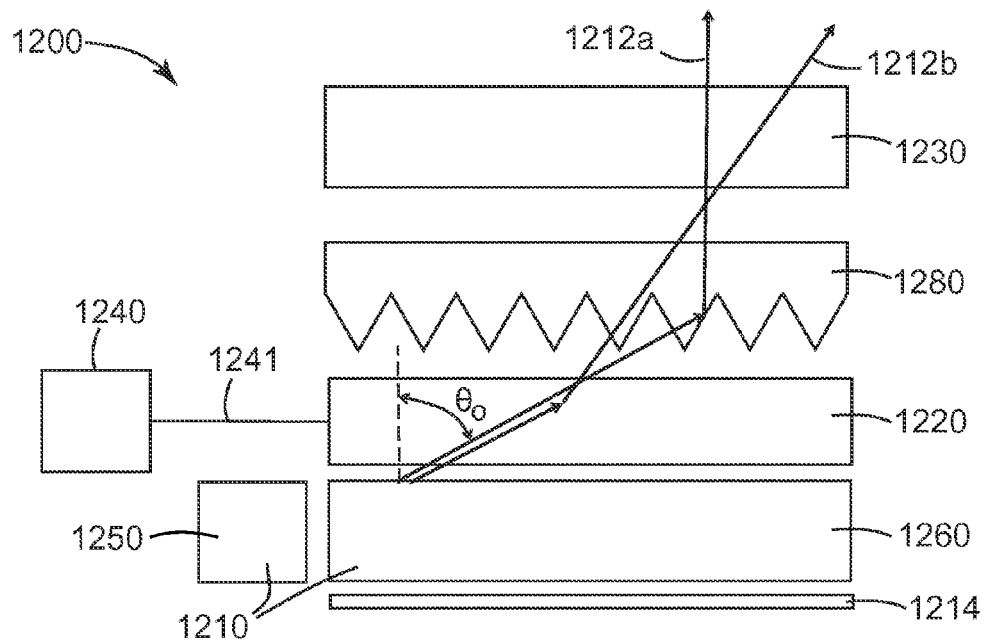
FIG. 12 is a side view of an optical system.

FIG. 12 is a schematic side view of optical system 1200 including lighting component 1210, reflector 1214, switchable diffuser 1220, display panel 1230, and diffuser controller 1240 which provides diffuser state data to switchable diffuser 1220 on diffuser data channel 1241. Lighting component 1210 includes light source 1250 and light guide 1260. Optical system 1200 is capable of producing light having optical path 1212a and light having optical path 1212b. Optical system 1200 also includes turning film 1280 which is disposed with prisms facing toward lighting component 1210. Display panel 1230 may include a liquid crystal display panel and may include other components such as a reflective polarizer for polarization recycling. Reflector 1214 is included to provide recycling of light reflected from turning film 1280 and/or from a reflective polarizer included with display panel 1230.

Light guide 1260 provides a light output that has an angular distribution with a peak intensity at an angle $\theta_O$ relative to a normal to the light guide. This can be achieved by using various extraction features in the light guide as is known in the art. Suitable extraction features include microstructures that may be created by injection molding, printing dots on a surface of the light guide, or molding the top and/or bottom surface of the light guide. The extraction features may be diffractive or refractive. Extraction features may also include converging, tapered surfaces to the light guide. Extraction features and methods of providing extraction features are described in U.S. Pat. No. 6,039,533 (Lundin et al.) and U.S. Pat. App. Pub. No. 2009/0244690 (Lee), for example.

The output of the light guide may partially collimated along the direction defined by the angle $\theta_O$. $\theta_O$ may be, for example, in the range of about 30 degrees to about 75 degrees. Light from the light guide 1260 passes through the switchable diffuser 1220 to the turning film 1280. Turning film 1280 is configured to turn light having a propagation direction specified by the angle $\theta_O$ toward the normal of the display panel. Light incident on turning film 1280 at input angles substantially different from $\theta_O$ will not necessarily be turned toward the normal of the display panel. In other words, turning film 1280 has a preferred input angle and will provide a preferred output when light having the preferred input angle is provided but will generally not provide the preferred output when other input distributions are provided.

When the switchable diffuser 1220 is in a substantially clear state, light passes through switchable diffuser 1220 without any substantial scattering so that it is provided to turning film 1280 at the turning film's preferred input angle. The light is then turned by turning film 1280 so that it has an output direction closer to the normal of the display panel than it would have had without the turning film 1280 present. For example, a light ray may follow optical path 1212a when the diffuser is in a substantially clear state. When switchable diffuser 1220 is in a hazy state, light from light guide 1260 can be deflected as it passes through switchable diffuser 1220 to turning film 1280 so that it is not provided to turning film 1280 at the turning film's preferred input angle. This allows the light to exit the display panel at a large angle relative to the normal to the display panel. For example, a light ray may follow optical path 1212b when the diffuser is in a hazy state.

Turning films generally include a microstructured surface, and the film is disposed such that the microstructured surface faces the light output surface of the lighting component. The microstructured surface can include any microstructured feature (any shape or size) as long as light from the lighting component can be redirected as desired. Useful turning films comprise microstructured features that are prisms; exemplary turning films of this sort include 3M Transmissive Right Angle Film II also known as TRAF II, and 3M Brightness Enhancement Film also known as BEF, both available from 3M Company (St. Paul, Minn.). In general the turning film can have any shape, size, surface structure, and/or orientation of features as long as the desired light redirecting function is achieved. If a plurality of features is used, then the number and/or arrangement of the features may be used to achieve the desired light redirecting function. Turning films can be fabricated by any number of methods known by those skilled in the art. Such methods include but are not limited to fabricating a tool using engraving, embossing, laser ablation or lithographic methods, then employing the tool to create the structured film/layer via cast-and-cure or extrusion replication techniques. Turning films may be produced from optical materials with low absorbance in the visible light range so that the turning films are low-absorbing films.

Materials useful for constructing light guides, turning films, prism films and other optical components include acrylic resins, such as polymethylmethacrylate (PMMA), polystryrene, polycarbonate, polyesters, and silicones.

Figure 13:
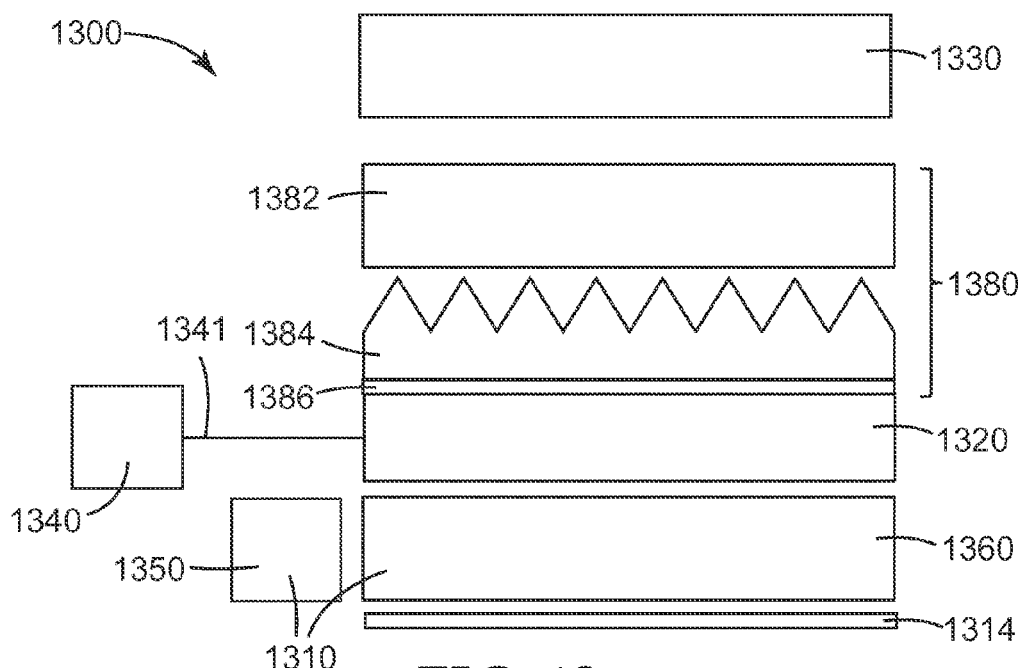
FIG. 13 is a side view of an optical system.

An embodiment of a system having the general structure of optical system 100 of FIG. 1 where optional first optical film 170 is not included and optional second optical film 180 includes crossed prism films is illustrated in FIG. 13.

FIG. 13 is a schematic side view of optical system 1300 including lighting component 1310, reflector 1314, switchable diffuser 1320, display panel 1330, and diffuser controller 1340 which provides diffuser state data to switchable diffuser 1320 on diffuser data channel 1341. Lighting component 1310 includes light source 1350 and light guide 1360. Optical system 1300 also includes film stack 1380 which includes a first prism film 1382, a second prism film 1384 and an optical coupling layer 1386. Display panel 1330 may include a liquid crystal display panel and may include a reflective polarizer film for polarization recycling.

Prisms films can be Brightness Enhancement Films (BEF) available from 3M Company (St. Paul, Minn.). In some embodiments, two prism films are used. For example, first prism film 1382 can have linear prisms extending along a first direction and second prism film 1384 can have prisms extending along a second direction different from the first direction. In some embodiments, the first direction and the second direction are substantially orthogonal. Prism films can be made using the techniques described elsewhere for making turning films.

Optical coupling layer 1386 can be any optically clear adhesive. Suitable optically clear adhesives include 3M Optically Clear Adhesive 8142KCL or 3M Optically Clear Adhesive 8146-X, both available from 3M Company (St. Paul, Minn.). In some embodiments, optical coupling layer 1386 is chosen to have a refractive index close to the refractive index of second prism film 1384. For example, in some embodiments, 3M Optically Clear Adhesive 8146-X, which has a refractive index of 1.474 for light having a wavelength of 589 nm (sodium D line) at 25° C., is used with an acrylic prism film having a refractive index of 1.491 for light having a wavelength of 589 nm (sodium D line) at 25° C.

Light output from lighting component 1310 passes through switchable diffuser 1320 and interacts with prism films 1382 and 1384. If switchable diffuser 1320 is in a substantially clear state, prism films 1382 and 1384 reflect light having a high incidence angle (i.e., large input angle relative to a normal axis) toward reflector 1314 which then reflects light back towards prism films 1382 and 1384. Reflector 1314 may be a diffuse or a semi-specular reflector so that a portion of the light that reflects away from reflector 1314 has an angle of reflection different from the angle of incidence. Optical system 1300 can recycle light to produce a partially collimated output. Prism films that increase collimation by a recycling mechanism are known in the art and are described, for example, in U.S. Pat. No. 4,542,449 (Whitehead), U.S. Pat. No. 5,175,030 (Lu et al.), and U.S. Pat. No. 5,183,597 (Lu). If switchable diffuser 1320 is in a hazy state, the input into the prism films 1382 and 1384 has a partially randomized angular distribution due to passing through the switchable diffuser 1320. In this case, the prism films are less effective in partially collimating the light output and so the resulting light output is a wide viewing angle output. Film stack 1380 can be made from optical materials having low absorbance in the visible light range so that film stack 1380 is a low-absorbing film stack.

This embodiment can be described in terms similar to those used to describe the embodiment where a turning film is used. Film stack 1380 has a preferred angular input distribution such that when light having this angular input distribution is supplied, film stack 1380 outputs partially collimated light. When other angular light distributions are supplied, for example an angular light distribution partially randomized by passing through a diffuser, film stack 1380 is not as effective in collimating the light output.

Figure 14:
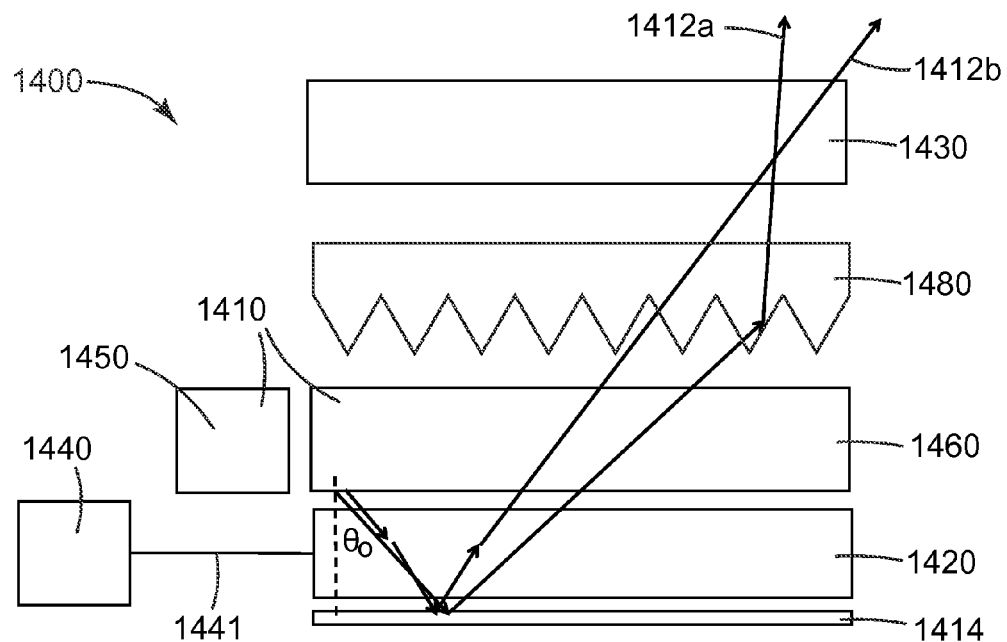
FIG. 14 is a side view of an optical system.

An embodiment of a system having the general structure of optical system 200 of FIG. 2 where optional first optical film 270 and optional second optical film 275 are not included and optional third optical film 280 is a turning film is illustrated in FIG. 14.

FIG. 14 is a schematic side view of optical system 1400 including lighting component 1410, reflector 1414, switchable diffuser 1420, display panel 1430, and diffuser controller 1440 which provides diffuser state data to switchable diffuser 1420 on diffuser data channel 1441. Lighting component 1410 includes light source 1450 and light guide 1460. Optical system 1400 is capable of producing light having optical path 1412a and light having optical path 1412b. Optical system 1400 also includes turning film 1480 which is disposed with prisms facing toward lighting component 1410. Light guide 1460 provides a light output that has an angular distribution with a peak intensity at an angle $\theta_O$ relative to a downward normal to the light guide. As discussed elsewhere, this can be achieved by using various extraction features in the light guide as is known in the art. $\theta_O$ may be, for example, in the range of about 30 degrees to about 75 degrees. The output of the light guide may be partially collimated along the direction defined by the angle $\theta_O$.

Light from the light guide 1460 passes through the switchable diffuser 1420 to reflector 1414, where it reflects, and it is then transmitted through light guide 1460 towards the turning film 1480. Reflector 1414 may be a substantially specular reflector such as an Enhanced Specular Reflector (ESR) available from 3M Company (St. Paul, Minn.). Turning film 1480 is configured to turn light having a propagation direction specified by the angle $\theta_O$ toward the normal of the display panel. Light incident on turning film 1480 at input angles substantially different from $\theta_O$ will not necessarily be turned toward the normal of the display panel. In other words, turning film 1480 has a preferred input angle and will provide a preferred output when light having the preferred input angled is provided but will generally not provide the preferred output when other input distributions are provided.

When the switchable diffuser 1420 is in a substantially clear state, light passes through switchable diffuser 1420 without any substantial scattering so that it is provided to turning film 1480 at the turning film's preferred input angle. The light is then turned by turning film 1480 so that it has an output direction closer to the normal of the display panel than it would have had without turning film 1480 present. For example, a light ray may follow optical path 1412a when the diffuser is in a substantially clear state. When switchable diffuser 1420 is in a hazy state, light from light guide 1460 can be deflected as it passes through switchable diffuser 1420 to reflector 1414 and/or as it passes from reflector 1414 to turning film 1480 so that it is not provided to turning film 1480 at the turning film's preferred input angle. This allows the light to exit the display panel at a large angle relative to the normal to the display panel. For example, a light ray can follow optical path 1412b when the diffuser is in a hazy state.

Figure 15:
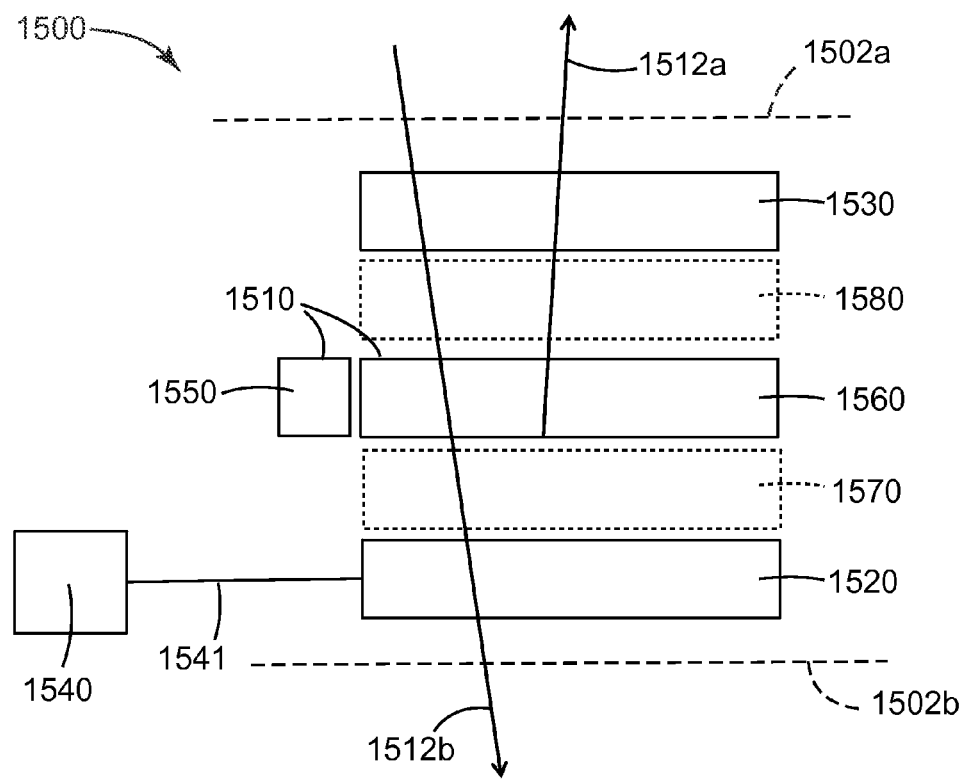
FIG. 15 is a side view of an optical system.

FIG. 15 is a schematic side view of optical system 1500 having a first output surface 1502a and a second output surface 1502b and including lighting component 1510 that is capable of producing light having optical path 1512a, electrically switchable diffuser 1520, display panel 1530, and diffuser controller 1540 which provides diffuser state data to switchable diffuser 1520 on diffuser data channel 1541. Lighting component 1510 includes light source 1550 and light guide 1560. Optical system 1500 can also include optional first optical film 1570, and/or optional second optical film 1580. One or more of optional optical films 1570 and 1580 can be a single film or can be a stack of other films which may be laminated together with an optically clear adhesive or may be stacked together with an air gap between layers. For example, in some embodiments optional second optical film 1580 is a low-absorbing optical component which has diffractive features and optional first optical film 1570 is either absent or is a low-index optical adhesive that attaches switchable diffuser 1520 to light guide 1560. Light guide 1560 includes extraction features designed to extract light towards first output surface 1502a. For example, a light ray from lighting component 1510 having optical path 1512a is transmitted through display panel 1530 through first output surface 1502a towards a primary viewer. Ambient light may pass through first output surface 1502a, pass through display panel 1530 and continue through second output surface 1502b. For example, an ambient light ray having optical path 1512b is transmitted through display panel 1530 through second output surface 1502b towards a secondary viewer.

Optical system 1500 is in a shared mode when electrically switchable diffuser 1520 is in a substantially clear state as imaged ambient light can reach second output surface 1502b without substantial scattering in this case. Optical system 1500 is in a private mode when electrically switchable diffuser 1520 is in a hazy state as imaged ambient light is scattered by switchable diffuser 1520 before reaching second output surface 1502b thereby obscuring any image that would otherwise be present in the imaged ambient light. This mode may also be described as a narrow viewing angle mode since the imaged light output is largely in the forward direction. Similarly, optical system 1500 can be described as being in a wide viewing angle mode when the switchable diffuser is in a substantially clear state since there is imaged light output in both the forward and rearward directions.

Various embodiments of optical systems including a low-absorbing optical component are discussed in commonly assigned U.S. Patent Application Ser. No. 62/005,573, entitled "Optical Systems Having Variable Viewing Angles" and filed on an even date herewith, which is hereby incorporated herein by reference in its entirety.

The following is a list of exemplary embodiments of the present description.

Item 1 is an optical system comprising:
a display panel;
an electrically switchable diffuser disposed proximate the display panel, the switchable diffuser having one or more regions, and the switchable diffuser having a diffuser state, each of the one or more regions capable of being in a first state or in a second state different from the first state;
a lighting component either disposed between the display panel and the switchable diffuser or disposed adjacent the switchable diffuser opposite the display panel; and
a diffuser controller configured to control the diffuser state and to control an output level of the display panel,
wherein the diffuser controller is configured to determine whether a first diffuser state of the switchable diffuser is to be changed and if the diffuser controller determines that the first diffuser state is to be changed, the diffuser controller is configured to switch the switchable diffuser from the first diffuser state to a second diffuser state over a first time period;
wherein the diffuser controller is configured to determine whether to vary an output level of the display panel in association with a change from the first diffuser state to the second diffuser state and if the diffuser controller determines that the output level is to be varied, the diffuser controller is configured to vary the output level over a second time period, the second time period overlapping with the first time period; and
wherein the diffuser controller is configured to vary the output level in association with at least one diffuser state change.

Item 2 is the optical system of item 1, wherein the switchable diffuser is bistable.

Item 3 is the optical system of item 2, further comprising a switching device and a display housing containing the display panel and the lighting component, wherein the switching device is separable from the display housing and the switching device is capable of applying a switching waveform to the switchable diffuser when the display housing is in at least one position proximate the switching device.

Item 4 is an optical system comprising:
  a display panel;
  a bistable, electrically switchable diffuser disposed proximate the display panel, the switchable diffuser having one or more regions, the switchable diffuser having a diffuser state, each of the one or more regions capable of being in a first state or in a second state different from the first state;
  a lighting component either disposed between the display panel and the switchable diffuser or disposed adjacent the switchable diffuser opposite the display panel;
  a display housing containing the display panel, the lighting component and the switchable diffuser;
  a diffuser controller configured to control the diffuser state; and
  a switching device external to the display housing, the switching device capable of applying a switching waveform to the switchable diffuser when the display housing is in at least one position proximate the switching device,
  wherein the diffuser controller is configured to determine whether a first diffuser state of the switchable diffuser should be changed and if the diffuser controller determines that the first diffuser state should be changed and if the display housing is in the at least one position proximate the switching device, the diffuser controller is configured to provide a control signal to the switching device to switch the switchable diffuser from the first diffuser state to a second diffuser state over a first time period.

Item 5 is the optical system of item 4, wherein the diffuser controller is further configured to control an output level of the display panel.

Item 6 is the optical system of item 5, wherein the diffuser controller is configured to determine whether to vary an output level of the display panel in association with a change from the first diffuser state to the second diffuser state and if the diffuser controller determines that the output level is to be varied, the diffuser controller is configured to vary the output level over a second time period, the second time period overlapping with the first time period.

Item 7 is the optical system of any of items 1 to 3 or 5 to 6, wherein the diffuser controller is configured to vary the output level of the display panel by varying a lighting level of the lighting component.

Item 8 is the optical system of item 7, wherein the diffuser controller is configured to vary the output level of the display panel by dimming the lighting level of the lighting component.

Item 9 is the optical system of any of items 1 to 3 or 5 to 6, wherein the diffuser controller is configured to set the lighting component at a first lighting level prior to varying the output level of the display panel and at a second lighting level different from the first lighting level after varying the output level of the display panel.

Item 10 is the optical system of any of items 1 to 3 or 5 to 6, wherein the diffuser controller is configured to vary the output level of the display panel by altering a video content provided to the display panel.

Item 11 is the optical system of item 10, wherein the diffuser controller is configured to vary the output level of the display panel by inserting dark frames into the video content.

Item 12 is the optical system of item 11, wherein the diffuser controller is configured to vary the output level of the display panel by altering a video content provided to regions of the display panel that are in a substantially clear state when the switchable diffuser is in the first diffuser state.

Item 13 is the optical system of any of items 1 to 3 or 5 to 6, wherein the diffuser controller is configured to vary the output level of the display panel by varying a lighting level of the lighting component and by altering a video content provided to the display panel.

Item 14 is the optical system of any of items 1 to 3 or 5 to 6, wherein the diffuser controller is configured to vary the output level in association with diffuser state changes where at least one region is in a substantially clear state when the switchable diffuser is in the first diffuser state.

Item 15 is the optical system of any of items 3 to 6, wherein the diffuser controller is configured to determine if the display housing is in the at least one position proximate the switching device.

Item 16 is the optical system of item 15, wherein the diffuser controller is configured to execute an error handling process when the diffuser controller determines that the display housing is not in any of the at least one positions proximate the switching device and the diffuser controller determines that the first diffuser state of the switchable diffuser should otherwise be changed.

Item 17 is the optical system of item 16, wherein the error handling process includes providing a message to the display panel.

Item 18 is the optical system of any of items 1 to 6, wherein the lighting component is disposed between the display panel and the switchable diffuser.

Item 19 is the optical system of any of items 1 to 6, wherein the lighting component is disposed adjacent the switchable diffuser opposite the display panel.

Item 20 is the optical system of any of items 1 to 6, wherein the one or more regions of the switchable diffuser include at least four regions that are passive matrix addressable.

Item 21 is the optical system of any of items 1 to 6, wherein the first state is a hazy state and the second state is a substantially clear state.

Item 22 is the optical system of any of items 1 to 6, wherein each region is capable of being in a first state, a second state different from the first state, and a third state different from the first state and the second state.

Item 23 is the optical system of item 22, wherein the first state is a first hazy state having a first haze, the second state is a second hazy state having a second haze different from the first haze, and the third state is a substantially clear state.

Item 24 is the optical system of any of items 1 to 6, wherein the lighting component includes a backlight capable of providing a light output that is at least partially collimated, the first state is a hazy state, the second state is a substantially clear state, and wherein when the backlight provides the light output, the light output from the backlight that passes through the display panel and that passes through regions in the first state provides a first display output in a wide viewing angle mode and light output from the from the backlight that passes through the display panel and that passes through regions in the second state provides a second display output in a narrow viewing angle mode.

Item 25 is the optical system of item 24, wherein the diffuser controller is configured to provide a diffuser content to regions of the switchable diffuser in the first state.

Item 26 is the optical system of item 25, wherein the diffuser content is selected from the group consisting of: high contrast patterns, moving patterns, images, warnings and combinations thereof.

Item 27 is the optical system of any of items 1 to 6, wherein the switchable diffuser includes smectic A liquid crystal.

Item 28 is the optical system of any of items 1 to 6, wherein the diffuser controller is configured control the diffuser state such that a content is displayed in a narrow viewing angle mode or a wide viewing angle mode based on criteria selected from the group consisting of: whether the content includes a confidential mark, whether the content contains confidential key words, whether an image analysis indicates that the content contains confidential information, whether a current time determined by the diffuser controller is in a specified range, whether the content contains information from a secure internet address, whether the content is signed or encrypted, whether the content is to be displayed in a zone of the display panel that is designated as private, whether the content has been manually designated as private, whether the display panel is located in a specified geographic region, whether a power status is in a low state, whether the diffuser controller has detected the presence of non-primary viewers in a vicinity of a primary viewer, the physical orientation of the optical system, and combinations thereof.

Item 29 is the optical system of any of items 3 to 6, wherein when the display housing is in the at least one position proximate the switching device, the switching device is coupled to the switchable diffuser by inductive coupling.

Item 30 is the optical system of any of items 3 to 6, wherein the switching device further includes a power supply, a waveform generation unit and a pattern generator, the power supply configured to supply power to the pattern generator and the waveform generation unit, the pattern generator configured to produce a pattern signal, the pattern signal provided directly or indirectly to the waveform generation unit, the waveform generation unit configured to provide a waveform to the switchable diffuser when the display housing is in the at least one position proximate the switching device and the diffuser controller determines that the first diffuser state of the switchable diffuser should be changed.

Item 31 is the optical system of item 30, wherein the switching device further includes a carrier generator and a modulator, the power supply configured to supply power to the carrier generator and the modulator, the pattern generator configured to provide the pattern signal to the modulator, the modulator configured to provide a modulated signal to the waveform generation unit.

Item 32 is the optical system of item 31 further comprising a demodulator disposed in the display housing and configured to convert a modulated waveform into a demodulated waveform.

Item 33 is the optical system of any of items 3 to 6, wherein the switching device is housed in a dock and the display housing is attachable to and detachable from the dock.

Item 34 is the optical system of any of items 1 to 6, further comprising a computer configured to implement the diffuser controller.

Item 35 is the optical system of item 34, wherein the computer is configured to provide display information to the display panel in a first data channel and the computer is configured to provide diffuser state information to the switchable diffuser in a second data channel.

Item 36 is the optical system of item 35, wherein the first data channel and the second data channel are separate data channels.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
    a display panel;
    an electrically switchable diffuser disposed proximate the display panel, the switchable diffuser having one or more regions, and the switchable diffuser having a diffuser state, each of the one or more regions capable of being in a first state or in a second state different from the first state;
    a lighting component either disposed between the display panel and the switchable diffuser or disposed adjacent the switchable diffuser opposite the display panel; and
    a diffuser controller configured to control the diffuser state and to control an output level of the display panel,
    wherein the diffuser controller is configured to determine whether a first diffuser state of the switchable diffuser is to be changed and if the diffuser controller determines that the first diffuser state is to be changed, the diffuser controller is configured to switch the switchable diffuser from the first diffuser state to a second diffuser state over a first time period;
    wherein the diffuser controller is configured to determine whether to vary an output level of the display panel in association with a change from the first diffuser state to the second diffuser state and if the diffuser controller determines that the output level is to be varied, the diffuser controller is configured to vary the output level over a second time period, the second time period overlapping with the first time period; and
    wherein the diffuser controller is configured to vary the output level in association with at least one diffuser state change.

2. The optical system of claim 1, wherein the switchable diffuser is bistable.

3. The optical system of claim 2, further comprising a switching device and a display housing containing the display panel and the lighting component, wherein the switching device is separable from the display housing and the switching device is capable of applying a switching waveform to the switchable diffuser when the display housing is in at least one position proximate the switching device.

4. The optical system of claim 1, wherein the diffuser controller is configured to vary the output level of the display panel by varying a lighting level of the lighting component.

5. The optical system of claim 4, wherein the diffuser controller is configured to vary the output level of the display panel by dimming the lighting level of the lighting component.

6. The optical system of claim 1, wherein the diffuser controller is configured to set the lighting component at a first lighting level prior to varying the output level of the display panel and at a second lighting level different from the first lighting level after varying the output level of the display panel.

7. The optical system of claim 1, wherein the diffuser controller is configured to vary the output level of the display panel by altering a video content provided to the display panel.

8. The optical system of claim 1, wherein the diffuser controller is configured to vary the output level of the display panel by varying a lighting level of the lighting component and by altering a video content provided to the display panel.

9. The optical system of claim 1, wherein the one or more regions of the switchable diffuser include at least four regions that are passive matrix addressable.

10. The optical system of claim 1, wherein the switchable diffuser includes smectic A liquid crystal.

11. The optical system of claim 3, wherein the switching device further includes a power supply, a waveform generation unit and a pattern generator, the power supply configured to supply power to the pattern generator and the waveform generation unit, the pattern generator configured to produce a pattern signal, the pattern signal provided directly or indirectly to the waveform generation unit, the waveform generation unit configured to provide a waveform to the switchable diffuser when the display housing is in the at least one position proximate the switching device and the diffuser controller determines that the first diffuser state of the switchable diffuser should be changed.

12. The optical system of claim 11, wherein the switching device further includes a carrier generator and a modulator, the power supply configured to supply power to the carrier generator and the modulator, the pattern generator configured to provide the pattern signal to the modulator, the modulator configured to provide a modulated signal to the waveform generation unit.

13. An optical system comprising:
a display panel;
a bistable, electrically switchable diffuser disposed proximate the display panel, the switchable diffuser having one or more regions, the switchable diffuser having a diffuser state, each of the one or more regions capable of being in a first state or in a second state different from the first state;
a lighting component either disposed between the display panel and the switchable diffuser or disposed adjacent the switchable diffuser opposite the display panel;
a display housing containing the display panel, the lighting component and the switchable diffuser;
a diffuser controller configured to control the diffuser state; and
a switching device external to the display housing, the switching device capable of applying a switching waveform to the switchable diffuser when the display housing is in at least one position proximate the switching device,
wherein the diffuser controller is configured to determine whether a first diffuser state of the switchable diffuser should be changed and if the diffuser controller determines that the first diffuser state should be changed and if the display housing is in the at least one position proximate the switching device, the diffuser controller is configured to provide a control signal to the switching device to switch the switchable diffuser from the first diffuser state to a second diffuser state over a first time period.

14. The optical system of claim 13, wherein the diffuser controller is further configured to control an output level of the display panel.

15. The optical system of claim 14, wherein the diffuser controller is configured to vary the output level of the display panel by varying a lighting level of the lighting component.

16. The optical system of claim 14, wherein the diffuser controller is configured to vary the output level of the display panel by dimming a lighting level of the lighting component.

17. The optical system of claim 14, wherein the diffuser controller is configured to set the lighting component at a first lighting level prior to varying the output level of the display panel and at a second lighting level different from the first lighting level after varying the output level of the display panel.

18. The optical system of claim 14, wherein the diffuser controller is configured to vary the output level of the display panel by altering a video content provided to the display panel.

19. The optical system of claim 14, wherein the diffuser controller is configured to vary the output level of the display panel by varying a lighting level of the lighting component and by altering a video content provided to the display panel.

20. The optical system of claim 14, wherein the diffuser controller is configured to determine whether to vary an output level of the display panel in association with a change from the first diffuser state to the second diffuser state and if the diffuser controller determines that the output level is to be varied, the diffuser controller is configured to vary the output level over a second time period, the second time period overlapping with the first time period.

21. The optical system of claim 13, wherein the one or more regions of the switchable diffuser include at least four regions that are passive matrix addressable.

22. The optical system of claim 13, wherein the switchable diffuser includes smectic A liquid crystal.

23. The optical system of claim 13, wherein the switching device further includes a power supply, a waveform generation unit and a pattern generator, the power supply configured to supply power to the pattern generator and the waveform generation unit, the pattern generator configured to produce a pattern signal, the pattern signal provided directly or indirectly to the waveform generation unit, the waveform generation unit configured to provide a waveform to the switchable diffuser when the display housing is in the at least one position proximate the switching device and the diffuser controller determines that the first diffuser state of the switchable diffuser should be changed.

24. The optical system of claim 23, wherein the switching device further includes a carrier generator and a modulator, the power supply configured to supply power to the carrier generator and the modulator, the pattern generator configured to provide the pattern signal to the modulator, the modulator configured to provide a modulated signal to the waveform generation unit.

* * * * *